US005790837A

United States Patent [19]
Weir et al.

[11] Patent Number: 5,790,837
[45] Date of Patent: Aug. 4, 1998

[54] METHOD AND SYSTEM FOR DEVICE VIRTUALIZATION BASED ON AN INTERRUPT REQUEST IN A DOS-BASED ENVIRONMENT

[75] Inventors: Andrew P. Weir, Blue Bell; Joseph T. Friel, Havertown, both of Pa.

[73] Assignee: Ensoniq Corporation, Malvern, Pa.

[21] Appl. No.: 712,363

[22] Filed: Sep. 11, 1996

[51] Int. Cl.[6] ................................. G06F 12/08; G06F 9/30
[52] U.S. Cl. .......................... 395/500; 395/375; 395/712; 395/800.04; 395/868; 395/870; 711/2; 711/203
[58] Field of Search ..................................... 395/500, 653, 395/527, 402, 733, 741, 591, 568, 375, 712, 800.04, 800.07, 856, 868, 870; 364/230.2; 711/2, 200, 203

[56] References Cited

U.S. PATENT DOCUMENTS

| | | | |
|---|---|---|---|
| 5,293,590 | 3/1994 | Keener et al. | 395/325 |
| 5,303,378 | 4/1994 | Cohen | 395/700 |
| 5,390,332 | 2/1995 | Golson | 395/725 |
| 5,459,869 | 10/1995 | Spilo | 395/700 |

OTHER PUBLICATIONS

"Virtual Control Program Interface," Version 1.0, Jun. 12, 1989, (22 pages).
Encyclopedia of Computer Science, Third Edition, IEEE Press (1993), p. 486.
Microprocessors, "386™ DX Microprocessor," Intel (1989), pp. 4-190-4-191.
King, Adrian, "Inside Windows™ 95," Chapter 2, Microsoft Press, pp. 33-43.
"Microsoft MS-DOS 6 User's Guide", Microsoft Corporation (1993), pp. 87-89 and pp. 131-132.

*Primary Examiner*—Kevin J. Teska
*Assistant Examiner*—Thai Phan
*Attorney, Agent, or Firm*—Woodcock Washburn Kurtz Mackiewicz & Norris LLP

[57] ABSTRACT

A technique for providing device virtualization in an MS-DOS based operating environment, using an interrupt request (e.g., a non-maskable interrupt), is described. The technique includes executing an application on a processor within the MS-DOS based operating environment and, when the application attempts to address the device to be emulated, causing a processor interrupt to occur. In response to the interrupt, the processor executes code representing the virtualization of a device. The code for servicing the interrupt and emulating the device are written in protected-mode code, stored in the extended memory area, and made available by making appropriate entries into the interrupt descriptor tables (IDTs) for the protected-mode contexts which exist for the native protected-mode operating systems and for the DOS extender. The entries made into the IDT for the protected-mode context established for the DOS extender are accomplished by intercepting communications between the DOS extender and the virtual control program interface (VCPI).

17 Claims, 7 Drawing Sheets

METHOD AND SYSTEM FOR DEVICE VIRTUALIZATION BASED ON AN INTERRUPT REQUEST IN A DOS-BASED ENVIRONMENT

A portion of the disclosure of this patent document contains material which is subject to copyright protection, particularly Appendices A, B and C. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

This invention generally relates to computer software and, more particularly, it relates to the use of an interrupt request for triggering device virtualization services in a DOS-based operating system environment.

BACKGROUND OF THE INVENTION

MS-DOS is Microsoft's 16-bit operating system which runs on PC-XT- and PC-AT-type personal computers (PCs). This operating system (OS) was originally developed for the Intel 8086 and 8088 microprocessors which operate in what is generally referred to as "real-mode." Real-mode refers to the way the microprocessor handles memory (i.e., providing the user with a single-tasking working environment in which programs can freely access system memory and input/output devices). It is noted that real-mode, by itself, does not include features such as memory management or protection.

Today's personal computers are equipped with more advanced processors from Intel, specifically the 80386, 80486, and Pentium, all of which are capable of running 8086-compatible code (real-mode). These processors, however, have a more advanced 32-bit protected-mode which provides hardware support for multitasking, data security and virtual memory. Among other things, protected-mode allows access to more random access memory (RAM) than the 1 megabyte (MB) that the standard real-mode MS-DOS operating system permits (additional details described in King, A., "Inside Windows 95", Microsoft Press, pp. 33–43, 1994, which is herein incorporated by reference).

A typical memory configuration of a personal computer is shown in FIG. 1. The memory configuration of FIG. 1 shows a memory area 110 containing 640 kilobytes (K) of conventional memory. Because MS-DOS is designed for managing this conventional memory, an additional memory manager is not required. All MS-DOS based programs require conventional memory.

The remainder of the standard 1 MB is referred to as the upper memory area 112 which comprises 384K of memory above the 640K of conventional memory. The upper memory area 112 is generally used by system hardware, such as a display adapter. Unused parts of the upper memory area 112 are called upper memory blocks (UMBs). On any PC, UMBs can be used for running device drivers and memory-resident programs as described below.

An extended memory (XMS) area 114 is memory located beyond the 1 MB boundary on computers with 80286, 80386 or 80486 processors. Extended memory requires an extended-memory manager, such as HIMEM. A high memory area (HMA) 116 is approximately the first 64K of the extended memory area 114. The HMA 116 is a small address region, slightly less than 64K, above the 1 MB boundary that can be accessed by real-mode code. The address region of the HMA is from 100000h through 10ffefh. On a computer with extended memory, the setup program can install MS-DOS to run in the HMA 116. This provides more conventional memory to be available for other software programs.

Another type of memory available, as shown in FIG. 1, is known as expanded memory. An expanded memory board (EMS) 118 contains additional memory that some MS-DOS based applications can use. Most personal computers accommodate expanded memory. Expanded memory is installed on an expanded memory board 118 and requires an associated expanded memory manager. Computer software programs use expanded memory 64K at a time by addressing a part of the upper memory area 112 known as the EMS page frame. Because an expanded memory manager gives access to a limited amount of expanded memory at a time, using expanded memory is slower than using extended memory. A conventional software program such as EMM386 can simulate expanded memory using extended memory for programs that require it.

As MS-DOS matured through the 1980s, much of its functionality was added in the form of device drivers. As set forth in the Encyclopedia of Computer Science, Third Edition, IEEE Press (1993), which is hereby incorporated by reference, a device driver is a program or subprogram that is written to control either a particular hardware device or another software routine. This low-level software program is loaded into memory after the operating system boots and remains in memory for the duration of the operating session. As mentioned, the device driver can deal directly with the hardware of a particular device. The device driver is capable of responding to hardware and software interrupts and interfacing to the operating system through an established MS-DOS device driver protocol in order to serve as an interface between such hardware or software and the operating system (described in "Microsoft MS-DOS 6 User's Guide", Microsoft Corporation, pp. 87–89, 1993 and which is also hereby incorporated by reference). It should be noted that device drivers are generally limited in size to 64K bytes.

In addition to device drivers, MS-DOS also uses memory-resident software programs, often referred to as terminate-and-stay-resident programs (TSRs). These programs are executed like normal software programs, but after termination, a portion of the program remains installed in memory in order to monitor and/or service hardware or software interrupts. TSRs can also interface with the operating system in a limited sense, but they do not use the MS-DOS device driver protocol.

Both device drivers and TSRs are typically real-mode code and reside in memory below the MS-DOS 1 MB limit. In many cases, these resident software programs reside within the conventional 640K of memory which is normally used by MS-DOS to load and execute programs. As mentioned above, they may reside above the conventional 640K in the upper memory area 112 when, for example, a memory optimizing routine is executed such as MemMaker (additional details are provided in MS-DOS User's Guide, beginning on page 131). In this case, the driver or TSR would be placed into the upper memory area 112 with a link to its location placed in the 640K conventional memory 110 to indicate its memory location in the upper memory area 112. Even so, as more and more device drivers and TSRs are loaded into a system, the maximum allowable memory area for MS-DOS programs, drivers and TSRs is rapidly reduced.

To further illustrate the functional interrelationships of MS-DOS, device drivers, hardware, etc., FIGS. 2 through 4 illustrate the evolution, from a functional perspective, beginning with the original MS-DOS real-mode environment up to present day environments allowing for protected-mode and DOS extenders. It is noted that the functional interrelationships shown in FIGS. 2 through 4 are well known to those of ordinary skill in the art and well documented as well; therefore, each figure is only briefly described. A more comprehensive treatment of DOS extenders and their evolution is provided in Duncan et al., *EXTENDING DOS, A Programmer's Guide to Protected-Mode DOS*, 2nd Edition, Addison-Wesley (1992), which is herein incorporated by reference for its teaching of DOS extenders and associated aspects relevant herein.

Turning to the figures, FIG. 2 shows a block diagram of a conventional DOS operating environment with no memory management services. This operating environment is similar to that used in the 8086- and 8088-based PCs. The hardware 210 sends an interrupt request, represented by the dotted line 211, to the DOS operating system 212 which is initially serviced by the DOS Interrupt Vector Table 213. Based on the entries in Interrupt Vector Table 213, the interrupt request can be directed to the DOS OS 212, device drivers 214, TSRs 216, etc. Similarly, software interrupts generated by programs 218 are serviced by the DOS Interrupt Vector Table 213 and directed as appropriate.

As mentioned above, with the release of more powerful Intel processors in the late 1980s, special "extensions" to the standard MS-DOS operating system were developed to allow MS-DOS programs to easily access computer memory that would not otherwise be addressable using real-mode code. These extensions (i.e., device drivers) to the operating system take advantage of the protected-mode features of the 80X86 processors while allowing MS-DOS to continue executing in real-mode. These device drivers implement, as a minimum, memory management services referred to as EMS and XMS services. These services allow software programs to store and retrieve large amounts of data from the memory pool above the 1 MB boundary. However, they do not allow software programs to occupy this memory for execution purposes. The well known programs provided by Microsoft to implement this functionality are called HIMEM.SYS and EMM386.EXE.

Continuing with the figures, FIG. 3 shows a block diagram of a conventional DOS operating environment with conventional memory management services 312 installed for managing the extended memory area 114. This operating environment is similar to that used in 80286-based PCs through Pentium-based PCs. As shown in FIG. 3, a protected-mode OS 310 executes above the DOS OS 212. An interrupt request 311 generated in this environment passes first into the protected-mode OS 310 allowing for higher level management. As shown, the interrupt request 311, based on entries in an Interrupt Descriptor Table (IDT, described in more detail below), may be directed to memory management services 312, to the Virtual Control Program Interface (VCPI) 314, or to the default DOS service via the DOS Interrupt Vector Table 213 as in the FIG. 2 type systems. As shown, the protected-mode OS includes the IDT 318 as well as a GDT 320. Additional details of the operation of the VCPI are described in the Virtual Control Program Interface specification, Version 1.0, (1989), which is herein incorporated by reference for its teachings regarding the operation of a VCPI.

Concurrent with the development of these memory extensions was the development of DOS extenders. FIG. 4 shows a block diagram of a conventional DOS operating environment with memory management services 312 installed and a DOS extender 410 running. DOS extenders are low-level software components that allow programs to be executed in protected-mode under MS-DOS. The DOS extender 410 allows protected-mode applications 412 to communicate with hardware and the OS and vice versa.

These programs can use the vast amount of memory above 1 MB to execute code as well as to store and retrieve data. However, the DOS extenders do not allow executable code to permanently reside in memory above the 1 MB boundary; rather, upon switching into protected-mode, the DOS extenders can temporarily copy executable code into the extended memory area for purposes of execution, but upon termination, it no longer exists in extended memory. Even so, the DOS extenders allow programs to apply a much simpler and much more powerful programming model. DOS extenders achieve their task by switching the processor into protected-mode while running the program, and switching the processor back to real-mode when the program completes.

The DOS extenders also switch the processor in and out of real-mode during the program execution when MS-DOS functions need to be called, or when device drivers or TSRs need to run. To do this, the DOS extender must be in complete control of the system. Thus, a new protected-mode operating environment is created by the DOS extender. As shown in FIG. 4, the newly created protected-mode operating environment created by the DOS extender 410 includes its own IDT 418 and GDT 420. It is noted, however, that when the DOS extender switches back to real mode it then uses system IDT 318 and system GDT 320.

In systems with memory management enabled, as shown in FIGS. 3 and 4, the device drivers that provide these services create their own protected-mode environment and already have MS-DOS running as a real-mode task. Therefore, they provide contention management services to negotiate memory allocation and mode switching between themselves and DOS extenders. This contention management is implemented by all memory managers today via the VCPI 314. If a DOS extender 410 determines that a VCPI 314 is present in a system, it uses this interface to acquire its protected-mode context and to perform its mode switching (real versus protected). In most cases, the DOS extender 410 also allocates all of its required program memory through the VCPI 314.

With this evolution in mind, as available memory, as well as processing power, continue to increase, it is desirable to make efficient use of these computing resources to provide device virtualization, thereby reducing the amount of hardware necessary to provide desirable features.

The 80386 and later processors do generally provide for hardware virtualization by allowing certain instructions to be "trapped." Specifically, if a program executes an "IN" or "OUT" (I/O) instruction, a General Protection Fault handler can be invoked to decide whether or not to let the IN/OUT execute and/or whether or not to emulate the presence of some hardware. This "I/O Trapping" can be applied to any process running below processor privilege level (or ring) 0. Unfortunately, most DOS extenders (Rational Systems' DOS4GW for example) run at ring 0, thus they are not subject to the 80386 I/O trapping mechanism.

In addition to the 80386 I/O trapping mechanism, at least one hardware manufacture has used a combination of external hardware interrupts and software to replace the functions of more costly hardware. Specifically, Advanced Gravis has used a technique which combines a Non-Maskable Interrupt (NMI) and a DOS TSR to virtualize hardware. Although this technique provides hardware virtualization for applications executing in real-mode, it does not provide virtualization for applications executing under a DOS extender, since there is no predetermined method for the OS to direct the interrupt services of the DOS extender.

There is, therefore, a real need to provide an efficient way of performing device virtualization which is also accessible by DOS extenders.

SUMMARY OF THE INVENTION

The present invention involves a technique for providing device virtualization in a DOS based operating environment including the steps of executing an application, under a DOS extender, on a processor within the DOS-based operating environment, where the application executes within a protected-mode context created for the DOS extender and the protected-mode context includes an interrupt descriptor table (IDT). Additionally, a processor interrupt is generated when the application addresses a predetermined address related to the device to be emulated and, responsive to the processor interrupt, an appropriate entry in the IDT associated with the protected-mode context of the DOS extender is referenced. In accordance with the invention, the DOS extender's IDT is patched at run-time to vector to device emulation software, thereby allowing the processor to execute computer code designed to emulate the device even though the DOS extender was not present at boot time.

DETAILED DESCRIPTION OF THE EXEMPLARY EMBODIMENTS

Overview

As mentioned in the Background section, device virtualization, in general, is known. Unfortunately, when running in the context of DOS extenders (e.g., Rational Systems' DOS4GW), device drivers cannot take advantage of the I/O trapping mechanism, nor can they take advantage of Advanced Gravis technique mentioned above in the Background section. Because many present day applications use DOS extenders for various reasons, a device virtualization technique should be accessible by applications running under DOS extenders.

Generally, the present invention provides device virtualization, in an MS-DOS based operating environment, by way of an interrupt request (e.g. non-maskable interrupt) for applications running with or without a DOS extender. The present invention dynamically extends its device virtualization capabilities to applications running under DOS extenders by intercepting communications between the DOS extender and the VCPI at run time. In particular, when an executing application requests the use of a particular device (e.g., requesting a predetermined I/O address), a processor interrupt request is generated. In response to the interrupt request, the device virtualization code for that particular device can be accessed and executed even for applications running under DOS extenders. It is noted that, in the exemplary embodiment, the present invention relies on the presence of a memory manager, or an equivalent thereof, to provide for a primary protected-mode operating environment including the system IDT and GDT.

Figure 1:
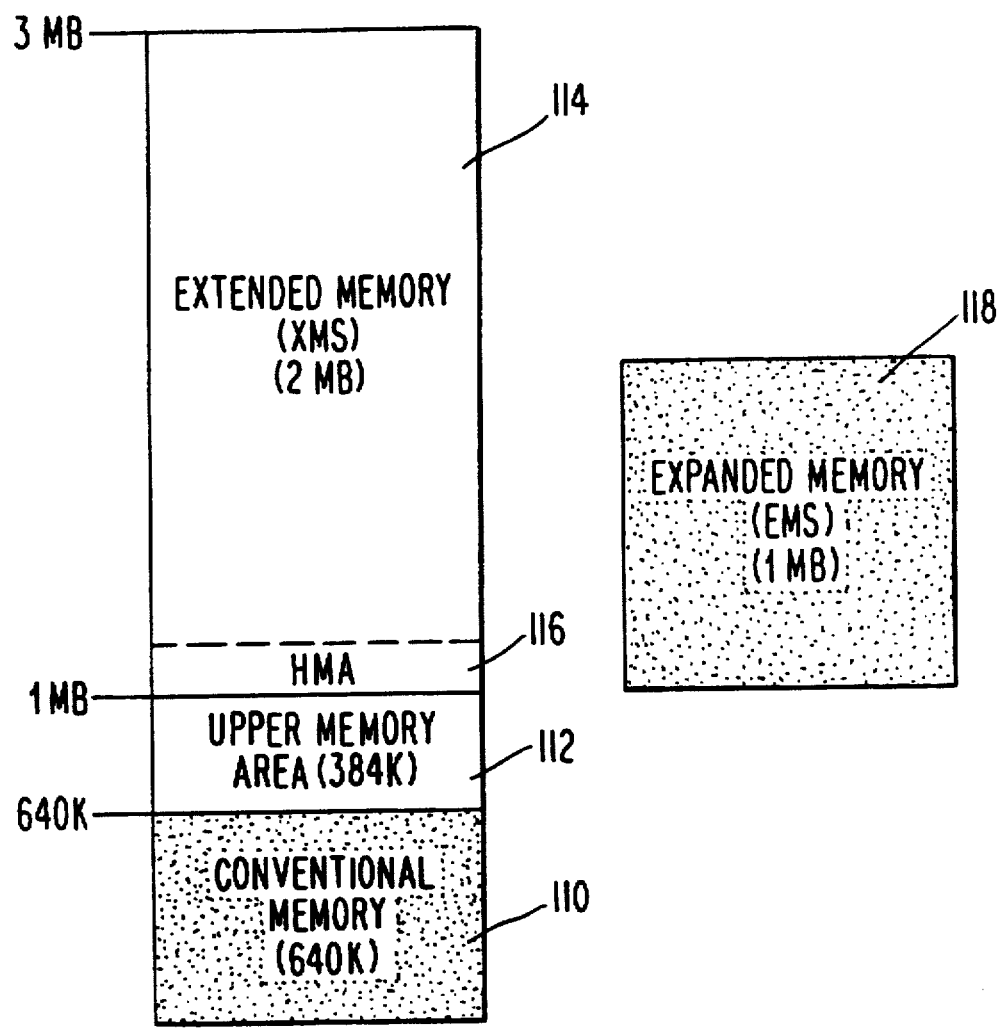
FIG. 1 is a block diagram of a conventional memory configuration of a personal computer.
Figure 2:
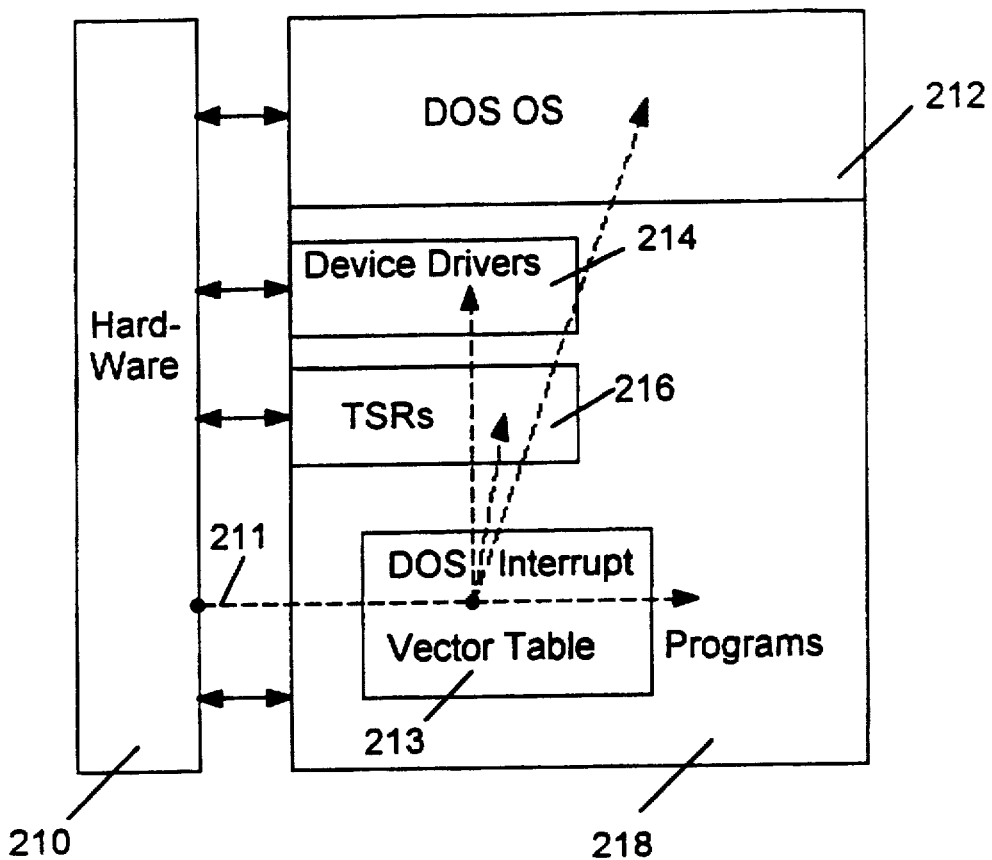
FIG. 2 is a high-level functional block diagram of a conventional DOS operating environment.
Figure 3:
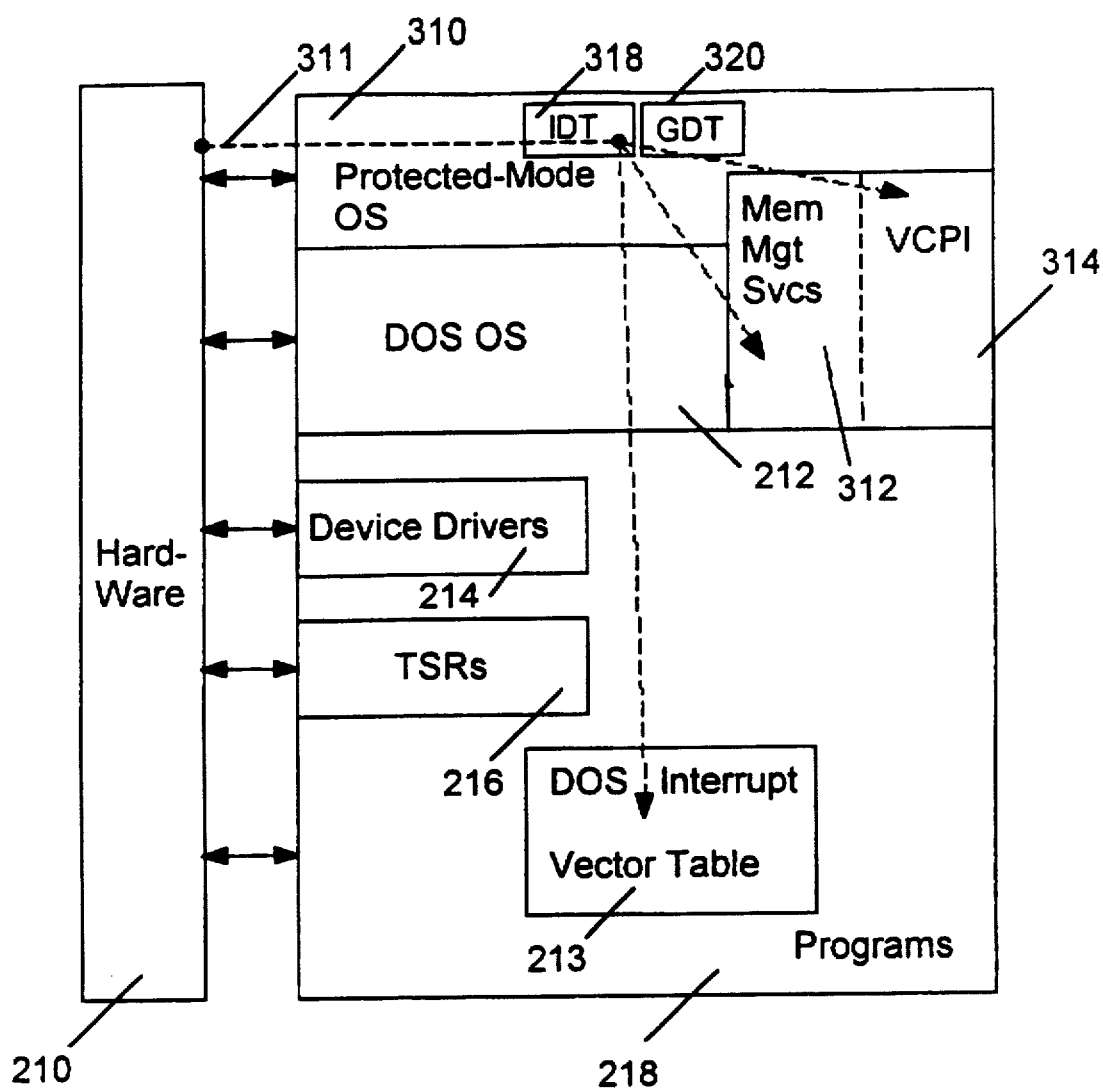
FIG. 3 is a high-level functional block diagram of a conventional DOS operating environment with memory management services installed.
Figure 4:
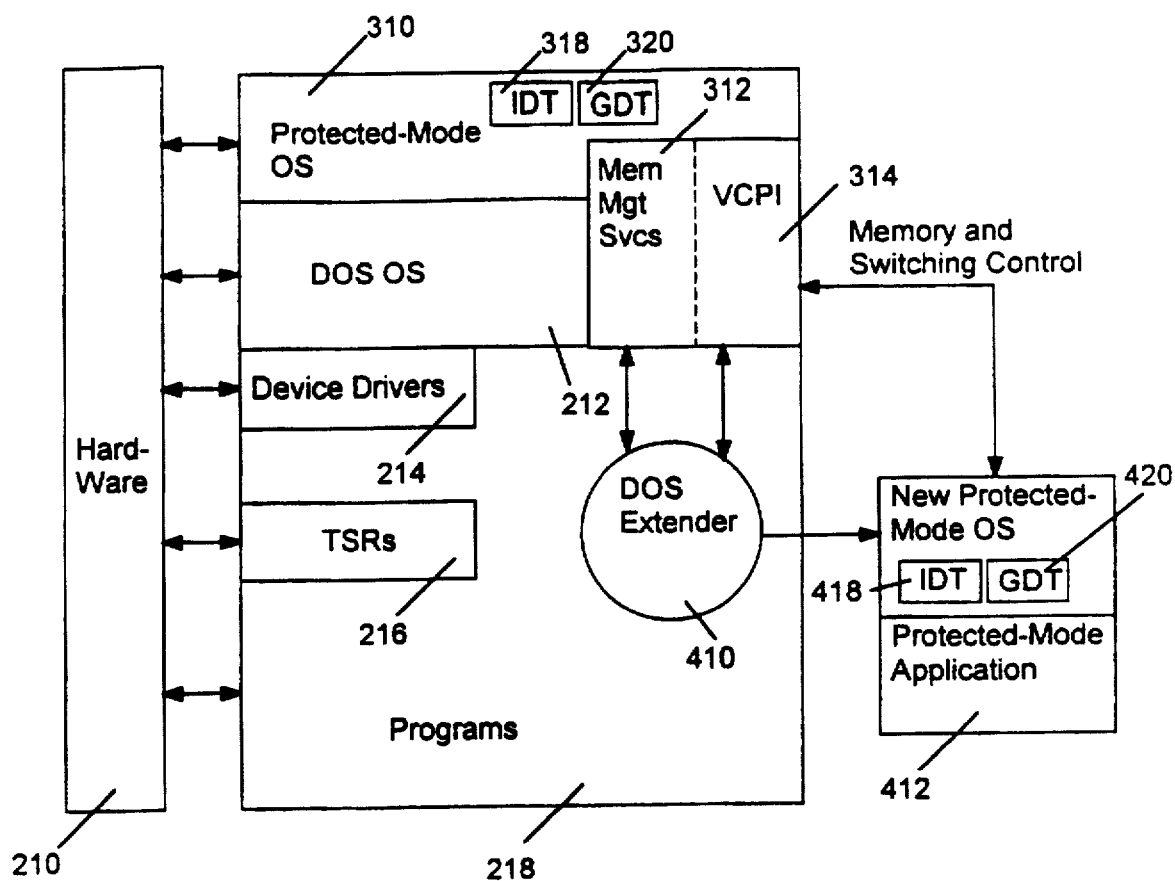
FIG. 4 is a high-level functional block diagram of a conventional DOS operating environment illustrating the functional relationships of DOS with memory management services and DOS extenders.
Figure 5:
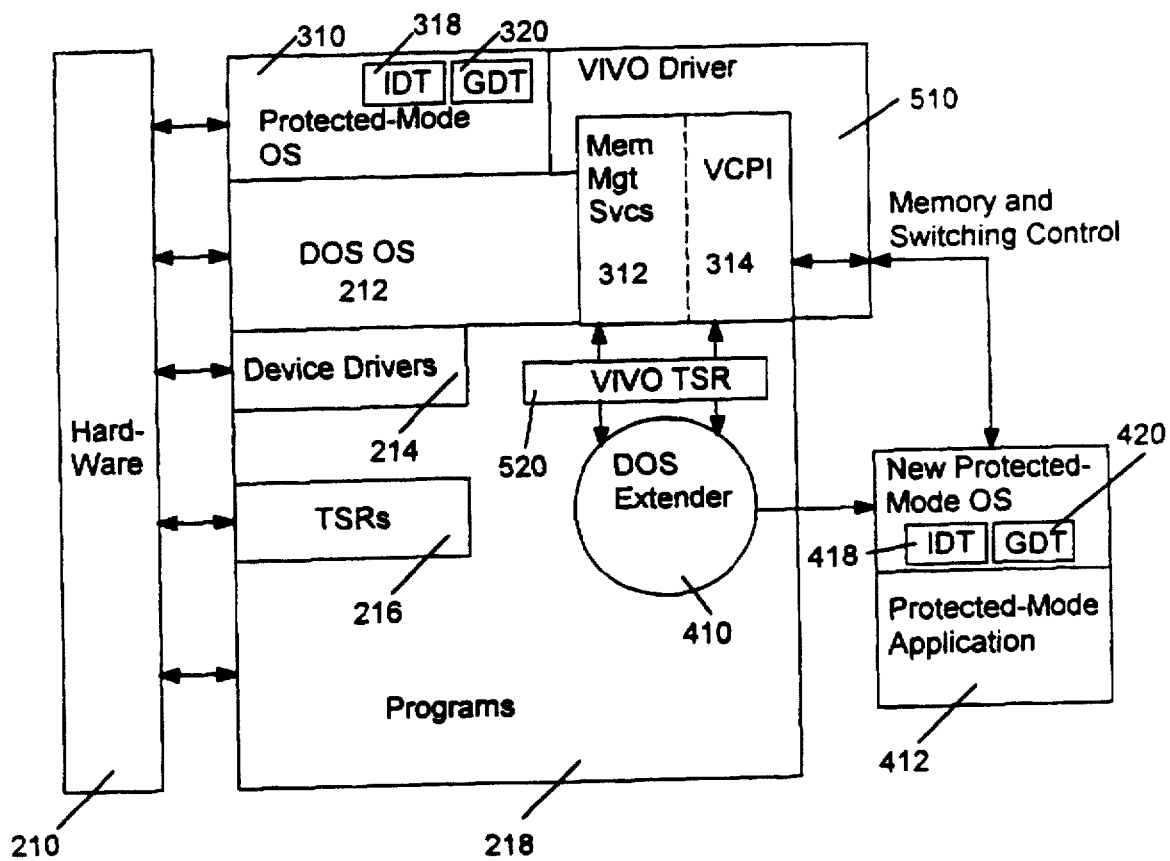
FIG. 5 is a high-level functional block diagram of a DOS operating environment as it relates to an exemplary embodiment of the present invention.

FIG. 5 is a block diagram illustrating the functional relationship between conventional operating system components in a typical MS-DOS environment as described in the Background section with reference to FIGS. 2 through 4 and an exemplary embodiment of the present invention.

As shown in FIG. 5, the present invention functionally represents a new functional layer working in conjunction with the protected-mode OS 310. This new layer is referred to, for purposes of this specification, as VIVO driver 510. Essentially, the VIVO driver 510 becomes an extension of the protected-mode operating system that supervises MS-DOS and DOS extenders instead of simply becoming an extension of MS-DOS itself, as is the case with standard device drivers and TSRs. In the exemplary embodiment of the present invention, in addition to VIVO driver 510 which represents a driver designed to provide the device virtualization services, a VIVO TSR 520 is provided to aid in the dynamic extension of the services by the VIVO driver 510 for use with DOS extenders 410.

The present invention includes loading protected-mode executable code, including an interrupt service routine and device virtualization code, into memory, and entering the associated interrupt service vector directly into the protected-mode operating system's interrupt descriptor table (IDT) 318. The use of IDTs is well known and additional details of descriptor addressing are described beginning on page 41 of the Windows '95 reference incorporated herein. Additional teachings on the use of IDTs can be found in *Microprocessors,* Intel (1989), which is also herein incorporated by reference. Briefly, the protected-mode IDT 318 determines interrupt vectoring instead of the DOS Interrupt Vector Table 213 even when the protected-mode OS 310 is running real-mode code. In many cases, such as MS-DOS OS calls, the services indicated by the IDT entries in IDT 318 simply pass control to the real-mode services indicated by the DOS interrupt vector table that were installed by MS-DOS. As well as being faster and more efficient than real-mode interrupt handlers, using the protected-mode IDT 318 makes the services of the present invention unconditionally available to the system whether it is running in real- or protected-mode.

Continuing, the present invention, by way of the VIVO TSR 520, uses the VCPI 'Get Protected-mode Interface' real-mode call (Int 67, function de01h) to force all of the DOS extender's 410 subsequent VCPI 314 protected-mode "far calls" to "pass through" the VIVO driver 510. It is noted that the 'Get Protected-mode Interface' is used by a DOS extender 410 at startup to acquire a protected-mode context. When the VIVO driver 510 intercepts these far calls, it is running under the context of the DOS extender's protected-mode OS (IDT 418, GDT 420). At this point, the VIVO driver 510 installs its interrupt service vector into the DOS extender's IDT 418 making the VIVO driver's device virtualization service available to the DOS extender 410 (and its applications) until it terminates.

Although the present invention is designed to operate using most any interrupt request, the exemplary embodiment of the present invention uses the non-maskable interrupt (NMI) as the interrupt request for triggering the device virtualization routine. It is noted that, historically, the NMI has been used by system motherboard logic to notify the operating system of a RAM (memory) parity error, or by I/O devices to notify the operating system of some "unrecoverable" error. Today, however, the RAM parity no longer exists and I/O devices do not implement NMI generation. A typical DOS extender's NMI handler, however, not knowing specifically how to handle such an event, simply re-boots the system rather than "passing-down" the interrupt to the currently installed DOS handler as it would do with a normal interrupt. Therefore, unlike other interrupt services, an NMI interrupt service routine installed under DOS would most likely be ignored by an application running under a DOS extender.

Description of Exemplary Embodiment

Although illustrated and described below with reference to certain specific embodiments, the present invention is nevertheless not intended to be limited to the details shown. Rather, various modifications may be made in the details within the scope and range of equivalents of the claims and without departing from the spirit of the invention.

Referring back to FIG. 5, in operation, when an interrupt request 311 (e.g., NMI) is generated, the protected-mode IDT 318 directs the flow of operation to the appropriate service routine based on the entries therein. If the interrupt is not intended for the VIVO driver 510, then the interrupt is passed on to the normal flow of operation.

When the VIVO driver 510 of the present invention is present with a DOS extender 410 running, the interrupt request is not passed directly to the DOS extender 410. Rather, if the interrupt request is intended for the VIVO driver 510, the VIVO driver 510 acts on the request directly. If the request is not for the VIVO driver 510, then control is passed to the DOS extender 410, and the DOS extender 410 handles it in its normal way. It is noted that, in the exemplary embodiment of the present invention, because the NMI is used, the device virtualization can be performed immediately following the "faulting" instruction (i.e., the instruction which caused the NMI).

Turning to the generation and installation of the present invention, after the computer code embodying the present invention is written, it is compiled/assembled and linked, in the exemplary embodiment, as zero address-based, non-relocatable, flat-model, 32-bit protected-mode code. The computer code embodying the present invention is then saved as a standalone binary file. It is noted that, in preparing the computer code embodying the present invention, protected-mode code is required (at least at the NMI service entry point) since the protected mode IDT's vectoring mechanism does not allow vectoring to real-mode (or virtual 8086) code. It is also noted that, although some real-mode code is required, the exemplary embodiment of the present invention is implemented using almost all protected-mode code since it is more efficient for vectoring and execution and can be completely located in extended memory, thereby avoiding memory-hungry DOS real-mode applications.

Basically, the VIVO driver 510 includes the device virtualization code for emulating the particular device and it includes the code necessary to receive, at run time, the re-directed "far calls" from the DOS extender 410, make the appropriate entries in the IDT 418, and pass control onto the VCPI 314. It also includes the Int 67 handler which is used to reflect the VCPI Get Protected-Mode Interface call return into the VIVO TSR 520. An exemplary implementation of VIVO driver 510 suitable for use with the present invention is included as Appendix A.

Figure 6:
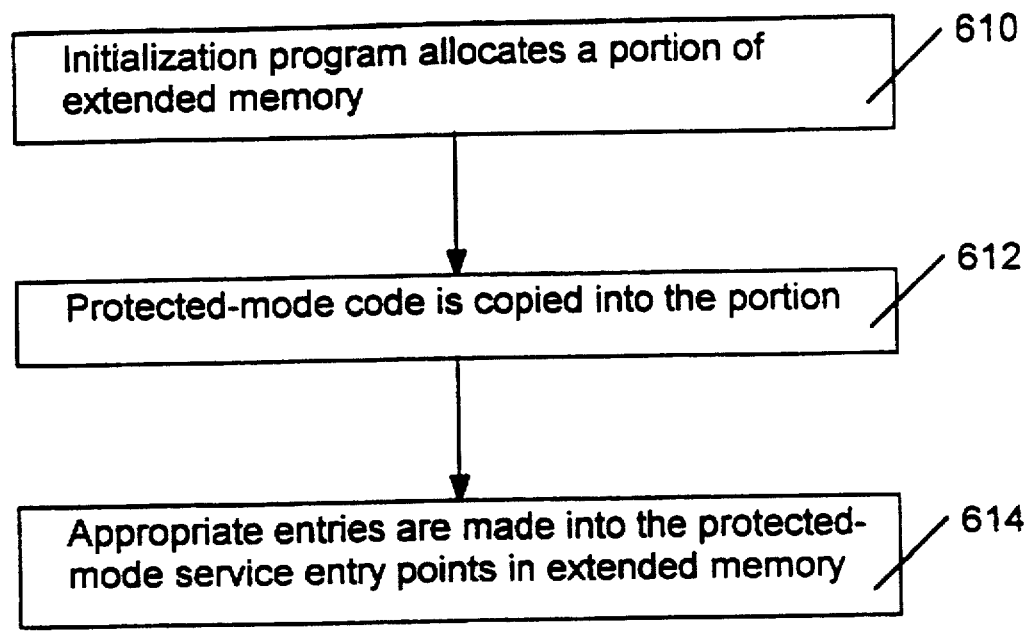
FIG. 6 is a flow diagram of the initialization operation, at boot time, of an exemplary embodiment of the present invention.

The installation and operation of the present invention is described with reference to the flowcharts in FIGS. 6 and 7. Referring to FIG. 6, at boot-time, in the exemplary embodiment of the present invention, an MS-DOS initialization program (e.g., ssinit.com) allocates a predetermined amount of the extended memory area 114 above the HMA 116 using an extended memory (XMS) interface reference, step 610. An exemplary implementation of ssinit.com suitable for use with the present invention is included as Appendix B. The predetermined amount of memory, in the exemplary embodiment of the present invention, is the size of the 32-bit protected-mode code file. Additionally, in the exemplary embodiment, the allocated memory is below the 4 Megabyte boundary. Then, the allocated memory, using the XMS interface, is locked and the physical address is saved.

Subsequently, the code embodying the present invention is copied into the allocated portion of extended memory, step 612. Appropriate entries are made into the protected-mode IDT 318 and GDT 320 to allow the associated hardware or software interrupt to vector directly to the 32-bit service entry point(s) in extended memory, step 614. It is noted that since the interrupt vectoring is done at the protected-mode level, the 32-bit services are always available and can be initiated by the protected-mode OS 310 without explicitly performing any time-consuming mode switching.

More specifically, steps 612 and 614 are accomplished as follows:

The protected-mode code file embodying the present invention is opened and a 1 kbyte portion of the code is loaded into local memory. In the exemplary embodiment of the present invention, this first portion of the code is loaded because it has variables that need to be initialized at pre-determined offsets which can only be determined at this stage of loading the program (e.g., configuration parameters).

Next, the VCPI "Get Protected-mode Interface" call (Int 67h, function de01h) is invoked and three selectors and an entry point offset are returned. The three selectors and the entry point offset are copied into a predetermined offset in the first portion of the protected-mode code. Also, the segment and offset of a portion of the MS-DOS initialization code is copied into a pre-determined offset in the first portion of the protected-mode code. This referenced portion of the MS-DOS initialization code remains resident after the MS-DOS inititialization code terminates and the protected-mode code, in the exemplary embodiment, will need to know where it is because it is essentially a shared dataspace used by the VIVO TSR 520 and the VIVO driver 510 to communicate.

Next, the first portion of the protected-mode code is copied into the allocated extended memory (e.g., using an XMS interface) and then the rest of the protected-mode code embodying the present invention is copied into extended memory in the same manner.

Next, the linear addresses for the protected-mode system IDT 318 and system GDT 320 and the physical address for the Page Directory (using standard 386 instructions) are obtained and saved. A protected-mode initialization program (e.g., a DOS4GW executable) is spawned and the physical address of the allocated Extended Memory, GDT and IDT linear addresses, as well as the Page Directory physical address, are passed thereto. An exemplary implementation of the DOS4GW executable suitable for use with the present invention is included as Appendix C. The functions of the protected-mode initialization program, in the exemplary embodiment of loading the present invention, are to:

1) Make three entries at the top of the protected mode OS's GDT 320. The first entry is a 32-bit code selector with a linear address based at the beginning of the allocated Extended Memory. The second entry is a data selector to alias the first entry. The third entry is a 32-bit data selector that is based at linear address 0 and has a maximum size (or limit).

2) Save the selector base of the entries made in step 1.

3) Make an entry into the protected mode OS's IDT 318 for vector 02h (the NMI vector). This vector uses the selector base saved above with an offset of zero (in the exemplary embodiment, the NMI entry point in the 32-bit code).

4) Save the original Int 67h vector.

5) Make an entry into the protected mode OS's IDT 318 for vector 67h (the Int 67 vector). This vector uses the selector base saved above with an offset of eight (the Int 67h intercept entry point in the 32-bit code).

6) Then, return control to the MS-DOS initialization program.

Finally, the MS-DOS initialization program terminates, leaving a relatively small program in memory—referred to above as the VIVO TSR 520. The general technique of leaving a TSR in memory upon initialization program termination is a well known technique to those of ordinary skill in the art.

By way of the Int 67h entry, the VIVO driver 510 is linked into the VCPI service/control chain via the IDT 318 for Interrupt 67h so that the hooks are present for the present invention to extend its functionality to DOS extenders 410 when they initialize. It is noted that Interrupt 67h is a control function interface to the EMS 118 and VCPI 314. This Interrupt 67h handler (VIVO driver 510) and VIVO TSR 520 act upon VCPI functions, and then pass control to the normal Interrupt 67h handler installed by the protected-mode OS.

At this point, the protected-mode OS 310 is configured such that hardware virtualization is available to all real-mode programs and drivers. There are also now hooks in place to allow for the extension of the device virtualization service to applications running under DOS extenders. It is noted that, in the exemplary embodiment of the present invention, although the hooks are put in place during boot time, the extension of the device virtualization services to applications running under DOS extenders is completed at run-time. This is an important aspect of the present invention becomes it allows the present invention to avoid many of the drawbacks of the prior art techniques.

It is noted that, although the above-described initialization process is performed using a combination of the MS DOS initialization program and the protected-mode initialization program, in an alternate embodiment, all of the initialization functions performed by the MS DOS initialization program can be performed by the protected-mode initialization program. To do so, the MS DOS initialization program needs to pass an extra parameter to the protected-mode initialization program. The extra parameter is the real-mode address of the shared data space within the DOS initialization program.

Continuing, the way in which the VIVO code of the present invention extends its functionality to DOS extenders via the Interrupt 67h handler is described with reference to the flowchart of FIG. 7.

Figure 7:
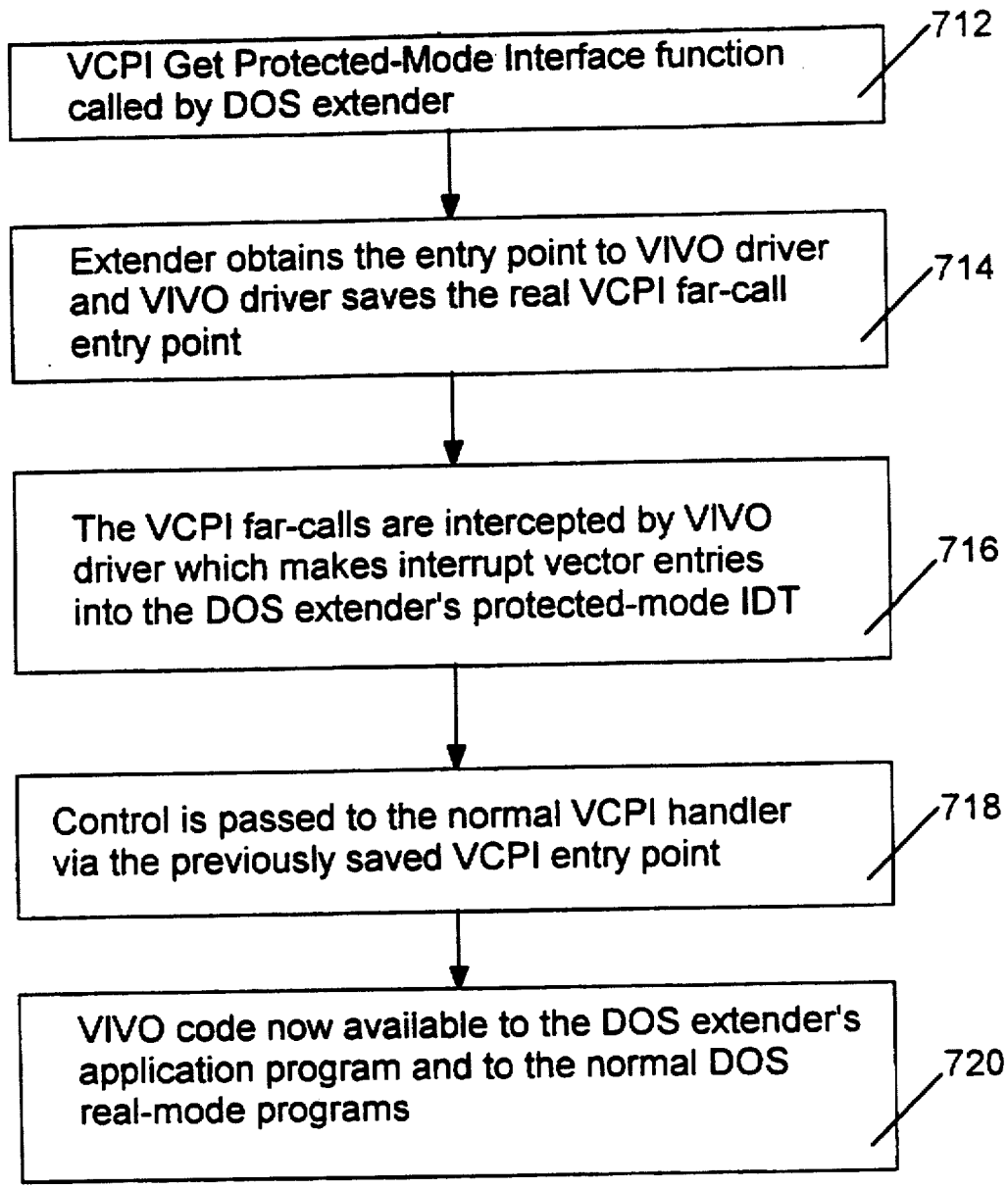
FIG. 7 is a flow diagram of the operation of an exemplary embodiment of the present invention, at run time, to provide compatibility with DOS extenders.

As shown in FIG. 7, after having established the VIVO TSR 520, it is triggered when, at run time, the DOS extender 410 calls the VCPI "Get Protected-Mode Interface" function, step 712, via Int 67h. At this point, the DOS extender 410, initially in real-mode, expects to acquire the protected-mode far-call entry point to the VCPI 314. This entry point is used by the protected-mode OS created by the DOS extender 410 to communicate directly with the VCPI 314 without invoking software interrupts and without switching to real mode. However, the VIVO TSR 520 of the present invention, having been passed control, indirectly, by the VIVO driver 510, at this point gives the DOS extender 410 an entry point to the VIVO driver 510, step 714. It is noted that, in the exemplary embodiment of the present invention, the VIVO TSR 520 relies on the presence of a VCPI 314, or equivalent thereof, for cooperation with DOS extenders 410.

By providing DOS extender 410 with an entry point into the VIVO driver 510 rather than the actual VCPI entry point, the DOS extender 410 will now pass through the VIVO driver 510 on subsequent "far calls." When the DOS extender 410 makes these VCPI "far calls," the system is in the DOS extender's IDT/GDT protected mode context. As such, when the VIVO driver 510 intercepts the VCPI far-calls, it makes its own interrupt vector entries into the DOS extender's protected-mode OS IDT 418, step 716, similar to that which was done for the native protected-mode OS 310. After making the appropriate entries, the VIVO driver 510 then passes control to the actual VCPI 314 via the previously saved VCPI protected-mode far-call entry point, step 718.

More specifically, steps 714, 716 and 718 are accomplished as follows:

The VIVO driver 510 intercepts the Get Protected-Mode Interface call at the Int 67h entry point (all other Int 67h calls are passed through to the default handler). The VIVO driver 510 saves the real-mode return address for the DOS extender 410 into the shared data space. It then changes the real-mode return address (stored on the processor stack) so that, when the actual VCPI service completes, control will pass to the VIVO TSR 520. So, essentially, all Int67h calls still get processed by the default handler except that a Get Protected-Mode Interface call causes the change of the real-mode return address, by the VIVO driver 510, prior to being processed by the default handler.

It is noted that, in an alternate embodiment, the function of intercepting the initial Int 67h call from the DOS extender 410 may be performed by VIVO TSR 520. This may be problematic, however, because when the present invention runs under a memory manager, such as QEMM by Quarterdeck Office Systems, the memory manager does not pass the VCPI Int 67h calls through the DOS Interrupt Vector Table, but rather, fields all VCPI Int 67h calls in protected mode via the IDT 318.

Continuing with the exemplary embodiment, in the case of the Get Protected-Mode Interface call, control is then passed to the VCPI 314 which performs its service. The VCPI 314 returns control, via the new return address, to the VIVO TSR 520. At this point, a page table context has been setup in the DOS extender's data space. The VIVO TSR 520 then makes additional page entries so that the VIVO driver 510 is valid within the DOS extender's protected-mode context. The VIVO TSR 520 then copies the three selectors being passed back to the DOS extender 410 into the shared data space as well as the VCPI far call entry offset. Next, the VIVO TSR 520 copies its own three selectors (described above) into the DOS extender's return data space. It then alters the VCPI entry offset (in register ebx) to 16, which is the offset into the VIVO driver 510 for the VCPI far call intercept. Finally, it returns control to the original real-mode return address (the DOS extender 410) saved above in the shared data space.

At this point, all VCPI far calls made by the DOS extender 410 now pass control to the VIVO driver 510 within the context of the DOS extender's new protected-mode OS. These calls include allocating extended memory for the DOS extender application and (temporarily) switching back to real-mode to service DOS interrupts and DOS OS calls. Whenever a VCPI far call is made, an interrupt entry is made in IDT 418 by VIVO driver 510.

With this completed, device virtualization (e.g., hardware virtualization) services are available to the DOS extender's protected-mode application program as well as to the normal DOS real-mode programs (i.e., VIVO driver 510 is accessible by programs running under DOS extender), step 720.

The VIVO driver 510 of the present invention, like other device drivers and TSRs, implements software services for hardware interrupt events. However, the VIVO driver 510 in accordance with the present invention is different than standard MS-DOS device drivers and TSRs. For example, the memory-resident, executable code of the VIVO driver 510 of the present invention can permanently reside above the 1 MB memory boundary and above the HMA 116. As such, the VIVO driver 510 does not compete for valuable memory space with standard MS-DOS programs and other device drivers and TSRs. Moreover, the VIVO driver 510 is not limited to the 64K restriction of a typical device driver allowing for applications significantly larger than 64K which is particularly useful when, for example, one desires to emulate hardware with software.

Commercial Embodiment

A commercial embodiment in accordance with the present invention is the Ensoniq® Soundscape™ sound card VIVO drivers. In this commercial embodiment, a VIVO driver is used to perform the function of hardware which previously existed on a sound card. By replacing the hardware with a VIVO driver, the space consumed and cost of the sound card are significantly reduced. In operation, when an application requests access to the sound card, the request is directly processed by the VIVO driver and the functionality of that hardware element is performed in software rather than hardware. This is possible, in part, because present generation microprocessors (e.g., Pentium) are so powerful that they typically have considerable idle time which can be used to execute the VIVO driver, which appears like an application, without a noticeable delay in other necessary processing. This is only one example of how the use of a VIVO driver provides substantial advantages to not only optimizing conventional memory space but also optimizing the size and cost of an auxiliary computer card.

In particular, in the commercial embodiment, if an application attempts to address the sound card in the processor I/O address space, normally 220h through 22fh, an NMI is generated. As a result, the VIVO driver performs functional emulation of various hardware previously residing on the card (e.g., the Sound Blaster) in response to I/O writes and, during certain I/O reads, the handler alters the hardware I/O return value (in the Intel 386, register EAX) in order to emulate or virtualize the presence of the hardware in the system. Since the commercial embodiment of the present invention optionally alters the processor register state, it is necessary that the NMI service routine execute immediately following the faulting I/O instruction.

Although illustrated and described above with reference to certain specific embodiments, the present invention is nevertheless not intended to be limited to the details shown. Rather, various modifications may be made in the details within the scope and range of equivalents of the claims and without departing from the spirit of the invention.

APPENDIX A

```
; The port mapping for the I/O handlers is as follows ...
;       BasePort+00h        IoMpuData
;       BasePort+01h        IoMpuCstat
;
;       WavePort+00h        IoWss
;       WavePort+01h        IoWss
;       WavePort+02h        IoWss
;       WavePort+03h        IoWss
;       WavePort+04h        IoCdAddr
;       WavePort+05h        IoCdData
;       WavePort+06h        IoPass
;       WavePort+07h        IoPass
;
;       220h    IoPass
;       221h    IoPass
;       222h    IoPass
;       223h    IoPass
;       224h    IoPass
;       225h    IoPass
;       226h    IoSblReset
;       227h    IoPass
;       228h    IoFmAstat
;       229h    IoFmData
;       22ah    IoSblData
;       22bh    IoPass
;       22ch    IoSblCstat
;       22dh    IoPass
;       22eh    IoSblRxrdy
;       22fh    IoPass
;
;       388h    IoFmAstat
;       389h    IoFmData
;       38ah    IoPass
;       38bh    IoPass
;
; The I/O handlers are 32-bit NEAR procedures that are called from the
; stub code. They will all assume the following register conventions.
;
; Entry:
; cs  -  I/O handlers' code selector
; ds  -  I/O handlers' data selector
; ah  -  x0xxxxxxb if the "faulting" I/O cycle was a read,
;        x1xxxxxxb if it was a write
; al  -  the write value if the "faulting" I/O cycle was a write,
;        otherwise undefined
; esi -  offset to the Soundscape hardware structure
;
; Exit:
; al  -  set to the prescribed return value if the faulting I/O cycle
;        was a read, otherwise preserved
; All other registers will be preserved by the I/O handlers.
;

.386p
        IF WIN_CODE
        include vmm.inc
        include debug.inc
        include sndscape.inc
        .xlist
        .list
        EXTRN gpSSI: DWORD
        ELSE
        .MODEL flat
        ENDIF INCLUDE vivo.inc EXTRN _synth_init: NEAR
        EXTRN _synth_process_MIDI: NEAR
        EXTRN _synth_all_notes_off: NEAR
```

-22-

```
            EXTRN   _synth_set_MT32: NEAR
            EXTRN   _fm_process: NEAR
            EXTRN   _synth_update: NEAR
            EXTRN   _otto_init: NEAR
            EXTRN   _otto_io_page: NEAR
            EXTRN   _otto_io_read: NEAR
            EXTRN   _otto_io_write: NEAR
            EXTRN   _otto_io_jam: NEAR
            EXTRN   _MT32: BYTE
            EXTRN   _num_active_voices: BYTE
            EXTRN   _fm_array: BYTE ; the SoundBlaster commands to emulate
DACIO_CMD           EQU     010h
DACDMA_CMD          EQU     014h
DAC82DMA_CMD        EQU     016h
DAC82DMAR_CMD       EQU     017h
DACAUTSTRT_CMD      EQU     01ch
DAC82AUTO_CMD       EQU     01fh
ADCIO_CMD           EQU     020h
ADCDMA_CMD          EQU     024h
ADCAUTSTRT_CMD      EQU     02ch
SETTC_CMD           EQU     040h
AUTOBLK_CMD         EQU     048h
DAC84DMA_CMD        EQU     074h
DAC84DMAR_CMD       EQU     075h
DAC83DMA_CMD        EQU     076h
DAC83DMAR_CMD       EQU     077h
DAC84AUTO_CMD       EQU     07dh
DAC83AUTO_CMD       EQU     07fh
SILENCE_CMD         EQU     080h
HALT_CMD            EQU     0d0h
SPKRON_CMD          EQU     0d1h
SPKROFF_CMD         EQU     0d3h
RESUME_CMD          EQU     0d4h
GETSPKR_CMD         EQU     0d8h
AUTOSTOP_CMD        EQU     0dah
INVBYTE_CMD         EQU     0e0h
GETVER_CMD          EQU     0e1h
SCRAMBLE_CMD        EQU     0e2h
SETTAG_CMD          EQU     0e4h
GETTAG_CMD          EQU     0e8h
ITEST_CMD           EQU     0f2h ; bit numbers for vFlags vars
RESET_SBFLAG        EQU     0
CODECON_SBFLAG      EQU     1
DPEND_SBFLAG        EQU     2
ITEST_SBFLAG        EQU     3
DACIO_SBFLAG        EQU     4
ADCIO_SBFLAG        EQU     5

T1PEND_FMFLAG       EQU     0
T2PEND_FMFLAG       EQU     1
FMIRQ_FMFLAG        EQU     2

UART_FLAG           EQU     0
MDATA_FLAG          EQU     1
DPEND_FLAG          EQU     2
FMDET_FLAG          EQU     3

; Write-Back status bits in Gate Array
SB_TXRDY            EQU     01h
SB_RXRDY            EQU     02h
MPU_TXRDY           EQU     04h
MPU_RXRDY           EQU     08h
FM_TIMER2           EQU     20h
FM_TIMER1           EQU     40h
FM_IRQ              EQU     80h ; some fm stuff
T1_TRIG             EQU     01h
```

```
T2_TRIG         EQU     02h
T2_MASK         EQU     20h
T1_MASK         EQU     40h
T_RESET         EQU     80h

T2_IRQ          EQU     20h
T1_IRQ          EQU     40h
FM_IRQ          EQU     80h

IF WIN_CODE
VxD_LOCKED_CODE_SEG
        PUBLIC _NmiIsr
_NmiIsr LABEL NEAR
        ELSE
_TEXT   SEGMENT

; NMI entry point here - jump over the hardware config and stub data
        jmp     NmiService ALIGN 4
        ; IRQ entry point here - skip to its service
        jmp     IrqService ALIGN 4
        ; Int 67h entry point here - skip to its service
        jmp     Int67Service ALIGN 4
        ; VCPI entry point here - skip to its service
        jmp     VcpiService ; VCPI and hardware config data here ... all other data at end
        ALIGN 4
VivoGentries    DD 6 DUP(?)
VcpiGentries    DD 6 DUP(?)
SharedDataP     DD ?
MidivectOff     DD ?
V86Gpmi         LABEL QWORD
VGoffset        DD ?
VGsegment       DD ?
V86Fix          LABEL QWORD
VFoffset        DD ?
VFsegment       DD ?
Int67Link       DF ?
VcpiEntry       LABEL FWORD
VEoffset        DD ?
VEselector      DW ?
HwConfig        HWSTRUCT < 0, 330h, 534h, 2180h, 5, 9, 1 >
        PUBLIC ExtMidi
ExtMidi         DB 00h
        PUBLIC _SynthVolL
_SynthVolL      DB 7fh
        PUBLIC _SynthVolR
_SynthVolR      DB 7fh
        ENDIF ; the NMI ISR front-end/back-end code ...
NmiService:
        push    ecx             ; ---ecx---
        mov     ecx,cs
        add     ecx,08h
        push    ds              ; ---ds---
        mov     ds,ecx
        IFE WIN_CODE
        mov     SSoffset,esp    ; switch to local stack
        mov     SSselector,ss
        mov     esp,OFFSET StackTop
        mov     ss,ecx
        ENDIF
        push    es              ; ---es---
        mov     es,ecx
        push    esi             ; ---esi---
```

-24-

```
        mov     esi,gpSSI           ; setup HW config ptr
        push    edx                 ;---edx---
        push    eax                 ;---eax---
        cld push    edx
        mov     dx,[esi.ssi_wIOAddressGA]
        add     dl,NMISTAT_OFF
        in      al,dx
        mov     ah,al
        inc     dl
        in      al,dx
        pop     edx                 ; ah:al is NMISTAT:NMIDATA
        ;
        test    ah,80h
        jz      SHORT nmiex
        push    eax
        and     ah,30h
        jz      SHORT nmisb
        cmp     ah,30h
        je      SHORT nmiad
        pop     eax push    edx
        and     dl,0feh
        cmp     dx,[esi.ssi_wIOAddressGA]
        je      SHORT nmimp
        and     dl,0f8h
        push    eax
        mov     ax,[esi.ssi_wIOAddressCODEC]
        sub     al,4
        cmp     dx,ax
        pop     eax
        je      SHORT nmicd
        pop     edx
        jmp     SHORT nmiex
nmisb:
        pop     eax
        mov     dl,ah
        and     edx,0000000fh
        call    SblTable[4*edx]     ; call the SoundBlaster service
        jmp     SHORT reack
nmiad:
        pop     eax
        mov     dl,ah
        and     edx,00000003h
        call    AdlTable[4*edx]     ; call the AdLib service
        jmp     SHORT nmiex
nmimp:
        pop     edx
        and     edx,00000001h
        call    MpuTable[4*edx]     ; call the MPU-401 service
        jmp     SHORT nmiex
nmicd:
        pop     edx
        and     edx,00000007h
        call    CdTable[4*edx]      ; call the CoDec service
        jmp     SHORT reack
        nop
reack:
        mov     dx,[esi.ssi_wIOAddressGA]
        add     dl,NMISTAT_OFF      ; ack again in case we touched CoDec
        in      al,dx
nmiex:
        in      al,61h              ; re-arm NMI edge detection
        and     al,0fh
        or      al,08h
        out     61h,al
        and     al,07h
        out     61h,al pop     eax
        pop     edx
```

-25-

```
            pop     esi
            pop     es
       IFE WIN_CODE
            lss     esp,SpSave
       ENDIF
            pop     ds
            pop     ecx
            iretd

IFE WIN_CODE

ALIGN 4
IrqService:
            push    ecx
            mov     ecx,cs
            add     ecx,08h
            push    ds
            mov     ds,ecx
            mov     SSoffset,esp
            mov     SSselector,ss
            mov     esp,OFFSET StackTop
            mov     ss,ecx
            push    es
            mov     es,ecx
            push    esi
            mov     esi,gpSSI
            push    edx
            push    eax
            cld
            call    IrqProcess
            pop     eax
            pop     edx
            pop     esi
            pop     es
            lss     esp,SpSave
            pop     ds
            pop     ecx
            iretd IrqProcess PROC mov     dx,[esi.ssi_wIOAddressOTTO]
            add     dl,38h
            in      al,dx
            add     dl,3
            in      al,dx
            test    al,80h
            jnz     SHORT ipeoi
            ;
            and     al,1fh
            cmp     al,1fh
            jne     SHORT iptsbt
            call    OttoTimer
            jmp     SHORT IrqProcess
iptsbt:
            cmp     al,1eh
            jne     SHORT IrqProcess
            call    OttoSbint
            jmp     SHORT IrqProcess
ipeoi:
            mov     al,20h
            cmp     [esi.ssi_bIRQGA],8
            jb      SHORT ipnosl
            out     0a0h,al
ipnosl:
            out     20h,al
            ret IrqProcess ENDP
```

-26-

```
vcpiService:
        cmp     al,0ch                  ; handle goto v86 mode separately
        je      vsgv86
        push    ecx                     ; save minimum regs
        mov     ecx,cs
        add     ecx,08h
        push    ds
        mov     ds,ecx
        pushfd                          ; no ints!
        cli
        mov     SSoffset,esp            ; switch to local stack
        mov     SSselector,ss
        mov     esp,OFFSET StackTop
        mov     ss,ecx
        push    es                      ; setup global data selector
        add     ecx,08h
        mov     es,ecx
        push    ebx
        push    esi sidt    ClientTab               ; patch client IDT
        mov     esi,CTladdr
        add     esi,10h
        mov     ebx,cs
        shl     ebx,16
        mov     ecx,00008e00h
        mov     es:[esi],ebx
        mov     es:[esi+4],ecx
        mov     bl,04h
        add     esi,MidivectOff
        mov     es:[esi],ebx
        mov     es:[esi+4],ecx
        mov     cl,al
        mov     al,80h
        out     70h,al
        xor     al,al
        out     70h,al
        mov     al,cl mov     ecx,0008h               ; find a GDT patch entry
        mov     ebx,cs
        cmp     ebx,0020h
        jae     SHORT csok
        mov     ecx,cs
        add     ecx,0018h
csok:
        mov     VEselector,cx           ; note GDT entry for call
        sgdt    ClientTab
        mov     esi,CTladdr             ; point into client table
        add     esi,ecx
        sub     esi,4
        mov     ecx,6
clslp:
        mov     ebx,es:[esi+4*ecx]      ; save current client entries
        mov     SaveGentries-4[4*ecx],ebx
        loop    clslp
        mov     ecx,6
clflp:
        mov     ebx,VcpiGentries-4[4*ecx] ; copy-in the real VCPI GDT entries
        mov     es:[esi+4*ecx],ebx
        loop    clflp
        ;
        call    vcpiEntry               ; make the real VCPI call
        ;
        mov     ecx,6
clrlp:
        mov     ebx,SaveGentries-4[4*ecx] ; restore client GDT entries
        mov     es:[esi+4*ecx],ebx
        loop    clrlp pop     esi
        pop     ebx                     ; restore working regs
        pop     es                      ; restore global selector
```

```
            lss     esp,SpSave              ; restore stack
            popfd
            pop     ds
            pop     ecx                     ; restore regs
            retf vsgv86:
            mov     eax,ds                  ; save regs
            mov     gs,eax
            mov     eax,cs                  ; setup seg registers
            add     eax,08h
            mov     ds,eax
            add     eax,08h
            mov     es,eax
            mov     [esp],ebx
            mov     [esp+4],ecx sidt    ClientTab               ; patch the client IDT
            mov     ebx,CTladdr
            add     ebx,10h
            mov     eax,cs
            shl     eax,16
            mov     ecx,00008e00h
            mov     es:[ebx],eax
            mov     es:[ebx+4],ecx
            mov     al,04h
            add     ebx,MidiVectOff
            mov     es:[ebx],eax
            mov     es:[ebx+4],ecx
            mov     al,80h
            out     70h,al
            xor     al,al
            out     70h,al mov     eax,[esp+10]            ; save client v86 destination
            mov     ax,[esp+8]
            mov     ebx,SharedDataP
            mov     es:[ebx+4],eax mov     eax,VFoffset            ; setup our v86 destination
            mov     [esp+8],eax
            mov     eax,VFsegment
            mov     [esp+12],eax
            mov     eax,cs
            mov     VEselector,ax           ; note selector for far call
            sgdt    ClientTab
            mov     ebx,CTladdr             ; point to client GDT patch entry
            add     ebx,eax
            sub     ebx,4
            mov     ecx,6
clfixlp:
            mov     eax,VcpiGentries-4[4*ecx] ; copy-in the real VCPI GDT entries
            mov     es:[ebx+4*ecx],eax
            loop    clfixlp
            mov     CTladdr,ebx             ; save GDT entry laddr for fixup
            ;
            mov     eax,cr3                 ; save client's cr3
            mov     ClientCr3,eax mov     ecx,[esp+4]
            mov     ebx,[esp]
            mov     eax,gs
            mov     ds,eax
            mov     eax,0de0ch              ; re-init function arg
            jmp     cs:VcpiEntry Int67Service:
            cmp     ax,0de01h               ; VCPI GetPMI call?
            jne     SHORT i67tfix
            push    eax
            mov     eax,cs
            push    edx
            add     eax,10h
```

```
            push    ds
            mov     ds,eax
            mov     eax,ss
            lar     eax,eax
            bt      eax,22
            jc      SHORT i67s32
            and     esp,0000ffffh
i67s32:
            mov     edx,cs:SharedDataP      ; setup ds:[edx] for shared data
            mov     [edx+8],di              ; save init di to shared space
            mov     ax,[esp+16]             ; save v86 return to shared space
            shl     eax,16
            mov     ax,[esp+12]
            mov     [edx],eax
            mov     eax,cs:VGoffset         ; force v86 ret to vivo gpmi code
            mov     [esp+12],eax
            mov     eax,cs:VGsegment
            mov     [esp+16],eax
            pop     ds
            pop     edx
            pop     eax
            jmp     cs:Int67Link            ; link to normal PM handler i67tfix:
            cmp     ax,0dee0h
            jne     SHORT i67tpic
            push    ebx                     ; save regs
            push    ecx
            mov     eax,cs
            add     eax,08h
            mov     ds,eax
            add     eax,08h
            mov     es,eax
            mov     eax,cr3
            mov     RegSave,eax
            mov     eax,ClientCr3           ; need client's page context
            mov     cr3,eax                 ; don't use stack until restored
            ;
            mov     ebx,CTladdr
            mov     ecx,6
i67fxlp:
            mov     eax,VivoGentries-4[4*ecx]  ; restore client GDT entries
            mov     es:[ebx+4*ecx],eax
            loop    i67fxlp
            ;
            mov     eax,RegSave
            mov     cr3,eax
            pop     ecx
            pop     ebx
            iretd i67tpic:
            cmp     ax,0de0bh
            jne     SHORT i67tcmd
            push    edx
            mov     edx,cs
            push    ds
            add     edx,08h
            mov     ds,edx
            mov     edx,gpSSI
            ;
            mov     al,bl
            cmp     [edx.ssi_bIRQGA],08h
            jb      SHORT i67pset
            mov     al,cl
            sub     al,08h
i67pset:
            add     al,[edx.ssi_bIRQGA]
            xor     edx,edx
            mov     dl,al
            shl     edx,3
            sub     edx,10h
            mov     MidiVectOff,edx
```

-29-

```
          mov      al,0bh
          pop      ds
          pop      edx
          jmp      cs:Int67Link i67tcmd:
          cmp      ax,0dee1h
          je       SHORT i67vcmd
          jmp      cs:Int67Link
i67vcmd:
          push     ecx
          mov      ecx,cs
          add      ecx,08h
          mov      ds,ecx
          mov      SSoffset,esp
          mov      SSselector,ss
          mov      esp,OFFSET StackTop
          mov      ss,ecx
          mov      es,ecx
          push     esi
          push     edx
          push     eax
          mov      esi,gpSSI
          cld cmp      bh,00h
          jne      SHORT i67upd
          call     IrqProcess
          jmp      i67cmdex
i67upd:
          cmp      bh,01h
          jne      SHORT i67ssv
          push     [esi.ssi_wHardwareOptions]
          call     _otto_init
          add      esp,4
          mov      SystemTime,0
          mov      ActiveCount,0
          call     _synth_init
          jmp      i67cmdex
i67ssv:
          cmp      bh,02h
          jne      SHORT i67gsv
          and      bl,7fh
          mov      _SynthVolL,bl
          mov      _SynthVolR,bl
          jmp      SHORT i67cmdex
i67gsv:
          cmp      bh,03h
          jne      SHORT i67smt
          mov      bl,_SynthVolL
          jmp      SHORT i67cmdex
i67smt:
          cmp      bh,04h
          jne      SHORT i67gmt
          and      bl,7fh
          push     ebx
          call     _synth_set_MT32
          add      esp,4
          jmp      SHORT i67cmdex
i67gmt:
          cmp      bh,05h
          jne      SHORT i67sxm
          mov      bl,_MT32
          jmp      SHORT i67cmdex
i67sxm:
          cmp      bh,06h
          jne      SHORT i67gxm
          and      bl,7fh
          mov      ExtMidi,bl
          jmp      SHORT i67cmdex
i67gxm:
          cmp      bh,07h
          jne      SHORT i67sws
```

```
                mov     bl,ExtMidi
                jmp     SHORT i67cmdex
i67sws:
                cmp     bh,08h
                jne     SHORT i67gws
                and     bl,7fh
                mov     WssSwtch,bl
                jmp     SHORT i67cmdex
i67gws:
                cmp     bh,09h
                jne     SHORT i67gbt
                mov     bl,WssSwtch
                jmp     SHORT i67cmdex
i67gbt:
                cmp     bh,0ah
                jne     SHORT i67pdt
                bsf     ax,[esi.ssi_wHardwareOptions]
                mov     bl,al
                jmp     SHORT i67cmdex
i67pdt:
                cmp     bh,0bh
                jne     SHORT i67cmdex
                not     bl
                jmp     SHORT i67cmdex
                nop
i67cmdex:
                pop     eax
                pop     edx
                pop     esi
                lss     esp,SpSave
                pop     ecx
                iretd

ENDIF

; handle otto timer int - assumes local stack, sels set, esi->HW;
OttoTimer PROC push    eax
                push    ecx
                push    edx cmp     ActiveCount,0
                je      SHORT otupd
                dec     ActiveCount
                jnz     SHORT otupd
                clc
                call    TimerCtl
otupd:
                push    1000
                mov     eax,SystemTime
                add     eax,16
                mov     SystemTime,eax
                push    eax
                call    _synth_update
                add     esp,8 pop     edx
                pop     ecx
                pop     eax
                ret OttoTimer ENDP ; handle otto SB int - assumes local stack, sels set, esi->HW;
        PUBLIC  OttoSbint
OttoSbint PROC push    eax
```

```
        push    ecx
        push    edx push    1eh                     ; freq page
        call    _otto_io_page
        add     esp,4
        ;
        xor     eax,eax                 ; zero freq
        push    eax
        push    04h
        call    _otto_io_write
        add     esp,8
        ;
        push    3eh                     ; addr page
        call    _otto_io_page
        add     esp,4
        ;
        pushd   80000000h               ; open loop
        push    08h
        call    _otto_io_write
        add     esp,8
        ;
        xor     eax,eax                 ; zero accum
        push    eax
        push    0ch
        call    _otto_io_jam
        add     esp,8
        ;
        pushd   0ff04h                  ; idle mode
        push    00h
        call    _otto_io_jam
        add     esp,8
        ;
        bts     sbFlags,ITEST_SBFLAG    ; note forced-int
        mov     dx,[esi.ssi_wIOAddressGA]
        add     dl,NMICTL_OFF           ; kill CoDec virtualization
        in      al,dx
        push    eax
        and     al,0c0h
        out     dx,al
        push    edx                     ; force int
        mov     dx,[esi.ssi_wIOAddressCODEC]
        sub     dx,4
        mov     al,40h
        out     dx,al
        pop     edx
        pop     eax
        out     dx,al                   ; re-enable CoDec virtualization push    38h
        call    _otto_io_read
        add     esp,4 pop     edx
        pop     ecx
        pop     eax
        ret

OttoSbint ENDP

PUBLIC  TimerCtl
TimerCtl PROC push    eax
        push    ecx
        push    edx pushfd
        push    1fh
        call    _otto_io_page
        add     esp,4
        popfd
```

```
                jnc     SHORT tcoff
                push    0ff28h
                jmp     SHORT tcset
tcoff:
                push    0ff08h
tcset:
                push    0
                call    _otto_io_jam
                add     esp,8 pop     edx
                pop     ecx
                pop     eax
                ret TimerCtl ENDP

IFDEF DOS_DEBUG

DbStatus PROC push    eax
                push    ebx
                push    es
                mov     eax,cs
                add     eax,10h
                mov     es,eax mov     ebx,000b8000h + 2*(80*24 + 79)
                mov     al,DebugByte
                mov     es:[ebx],al
                inc     al
                cmp     al,'9'
                jbe     SHORT ds1
                mov     al,'0'
ds1:
                mov     DebugByte,al pop     es
                pop     ebx
                pop     eax
                ret DbStatus ENDP PUBLIC DbPut8
DbPut8  PROC push    ebx
                push    ecx
                push    edx
                push    es
                mov     ecx,cs
                add     ecx,10h
                mov     es,ecx mov     ebx,DebugPtr
                xor     ecx,ecx
                mov     cl,2
d81:
                rol     al,4
                mov     dl,al
                and     dl,0fh
                cmp     dl,0ah
                jae     SHORT d82
                add     dl,'0'
                jmp     SHORT d83
d82:
                add     dl,'A' - 0ah
d83:
                mov     es:[ebx],dl
```

-33-

```
                inc     ebx
                inc     ebx
                cmp     ebx,0b0000h+3840
                jb      d8nw1
                mov     ebx,0b0000h
d8nw1:
                loop    SHORT d81 mov     BYTE PTR es:[ebx],' '
                inc     ebx
                inc     ebx
                cmp     ebx,0b0000h+3840
                jb      d8nw2
                mov     ebx,0b0000h
d8nw2:
                mov     BYTE PTR es:[ebx],'*'
                mov     DebugPtr,ebx pop     es
                pop     edx
                pop     ecx
                pop     ebx
                ret DbPut8          ENDP PUBLIC  DbPut16
DbPut16         PROC push    ebx
                push    ecx
                push    edx
                push    es
                mov     ecx,cs
                add     ecx,10h
                mov     es,ecx mov     ebx,DebugPtr
                xor     ecx,ecx
                mov     cl,4
d161:
                rol     ax,4
                mov     dl,al
                and     dl,0fh
                cmp     dl,0ah
                jae     d162
                add     dl,'0'
                jmp     SHORT d163
d162:
                add     dl,'A' - 0ah
d163:
                mov     es:[ebx],dl
                inc     ebx
                inc     ebx
                cmp     ebx,0b0000h+3840
                jb      d16nw1
                mov     ebx,0b0000h
d16nw1:
                loop    d161 mov     BYTE PTR es:[ebx],' '
                inc     ebx
                inc     ebx
                cmp     ebx,0b0000h+3840
                jb      d16nw2
                mov     ebx,0b0000h
d16nw2:
                mov     BYTE PTR es:[ebx],'*'
                mov     DebugPtr,ebx pop     es
                pop     edx
```

```
                pop     ecx
                pop     ebx
                ret
DbPut16 ENDP PUBLIC  DbPut32
DbPut32 PROC push    ebx
                push    ecx
                push    edx
                push    es
                mov     ecx,cs
                add     ecx,10h
                mov     es,ecx mov     ebx,DebugPtr
                xor     ecx,ecx
                mov     cl,8
d321:
                rol     eax,4
                mov     dl,al
                and     dl,0fh
                cmp     dl,0ah
                jae     d322
                add     dl,'0'
                jmp     SHORT d323
d322:
                add     dl,'A' - 0ah
d323:
                mov     es:[ebx],dl
                inc     ebx
                inc     ebx
                cmp     ebx,0b0000h+3840
                jb      d32nw1
                mov     ebx,0b0000h
d32nw1:
                loop    d321 mov     BYTE PTR es:[ebx],' '
                inc     ebx
                inc     ebx
                cmp     ebx,0b0000h+3840
                jb      d32nw2
                mov     ebx,0b0000h
d32nw2:
                mov     BYTE PTR es:[ebx],'*'
                mov     DebugPtr,ebx pop     es
                pop     edx
                pop     ecx
                pop     ebx
                ret DbPut32 ENDP

ENDIF

CdRead  PROC push    edx
                push    eax
                mov     dx,[esi.ssi_wIOAddressCODEC]
                in      al,dx
                and     al,0e0h
                or      al,ah
                out     dx,al
                pop     eax
                inc     dl
```

```
                in      al,dx
                pop     edx
                ret CdRead  ENDP Cdwrite PROC push    edx
                push    eax
                mov     dx,[esi.ssi_wIOAddressCODEC]
                in      al,dx
                and     al,0e0h
                or      al,ah
                out     dx,al
                pop     eax
                inc     dl
                out     dx,al
                pop     edx
                ret Cdwrite ENDP CdCtrl  PROC push    edx
                xchg    ah,al
                mov     dx,[esi.ssi_wIOAddressCODEC]
                out     dx,al
                xchg    ah,al
                inc     dl
                out     dx,al
                pop     edx
                ret CdCtrl  ENDP ; a function to set the CoDec freq corresponding to a SB TConst SetRate PROC cmp     al,Tconst
                jne     SHORT srnew
                ret
srnew:
                push    eax
                push    ecx
                push    edx mov     TConst,al
                cmp     al,0f0h
                jbe     tcok
                mov     al,0f0h
tcok:
                xor     ecx,ecx
                mov     cl,al
                not     cl
                inc     ecx
                mov     eax,1000000
                xor     edx,edx
                div     ecx
                mov     SbSrate,ax mov     dl,al
                mov     al,ah
                mov     ah,CD_UFREQ
                call    Cdwrite
                mov     al,dl
                inc     ah
                call    Cdwrite
```

-36-

```
                pop     edx
                pop     ecx
                pop     eax
                ret SetRate ENDP ; a function to mute/unmute the AD-1848 DAC
MuteCtl PROC push    eax
                push    ecx
                jc      muteon
muteoff:
                mov     SpkrStat,0ffh
                xor     cl,cl
                jmp     SHORT setvol
muteon:
                mov     SpkrStat,00h
                mov     cl,80h
setvol:
                mov     ah,CD_DACLVOL
                call    CdRead
                and     al,07fh
                or      al,cl
                call    CdWrite
                mov     ah,CD_DACRVOL
                call    CdWrite
                pop     ecx
                pop     eax
                ret MuteCtl ENDP ALIGN   4
        PUBLIC  IoMpuData
IoMpuData PROC test    ah,40h
                jnz     SHORT mdout
                btr     vFlags,DPEND_FLAG
                jc      SHORT mdmore
                call    GetMscStat
                or      al,MPU_RXRDY
                call    SetMscStat
                ret
mdmore:
                mov     al,MpuData
                call    MpuPutData
                ret
mdout:
                bt      vFlags,MDATA_FLAG
                jc      SHORT domidi
                ret
domidi:
                test    ExtMidi,7fh
                jnz     mduart ; apw make short
                test    al,80h
                jnz     SHORT status
                mov     dl,MidiStat
                cmp     dl,0f0h
                jae     mpdone
                xor     edx,edx
                mov     dl,MidiCurC
                mov     MidiData[edx],al
                cmp     dl,MidiDatC
                jb      SHORT cdmore
                mov     MidiCurC,0

; At this point we have accumulated a full MIDI message ...
                                -37-
```

```
                ; put it in eax and p_  it to the synth. The format w1   be
                ; EAX:    D31-D24   D23-D16   D15-D8    D7-D0
                ; MIDI:   ZERO      DATA1     DATA0     STATUS cmp     ActiveCount,0
                mov     ActiveCount,200         ; make sure timer is on
                jne     SHORT midcall
                stc
                call    TimerCtl
midcall:
                mov     eax,MidiMessage
                IF WIN_CODE
                Trace_Out "IoMpuData: MIDI Message Dump : #EAX", DeblevelMax
                ENDIF push    eax
                call    _synth_process_MIDI
                add     esp,4
                jmp     SHORT mpdone
cdmore:
                inc     dl
                mov     MidiCurC,dl
                jmp     SHORT mpdone
status:
                cmp     al,0f0h
                jae     SHORT sysstat
                mov     MidiStat,al
                mov     MidiCurC,0
                cmp     al,0c0h
                jae     sttex
                mov     MidiDatC,1
                jmp     SHORT mpdone
sttex:
                cmp     al,0e0h
                jb      st0dat
                mov     MidiDatC,1
                jmp     SHORT mpdone
st0dat:
                mov     MidiDatC,0
                jmp     SHORT mpdone
sysstat:
                cmp     al,0f8h
                jae     SHORT mpdone
                mov     MidiStat,al
mpdone:
                ret mduart:
                mov     ah,al
                mov     ecx,400000h
                mov     dx,[esi.ssi_wIOAddressGA]
                add     edx,UARTSTAT_OFF
mduwtx:
                in      al,dx
                test    al,02h
                jz      SHORT mduwtx
                mov     al,ah
                inc     edx
                out     dx,al
                ret IoMpuData ENDP ALIGN 4
        PUBLIC IoMpuCstat
IoMpuCstat PROC test    ah,40h
                jnz     SHORT mcout
                ret
mcout:
                cmp     al,0ffh
```

```
                jne     SHORT mcnores
                btr     vFlags,MDATA_FLAG
                btr     vFlags,UART_FLAG
                jc      SHORT mcnak
                mov     al,0feh
                call    MpuPutData
mcnak:
                push    0ffffffffh
                call    _synth_all_notes_off
                add     esp,4
                mov     ActiveCount,0
                clc
                call    TimerCtl
                ret
mcnores:
                bt      vFlags,UART_FLAG
                jnc     SHORT mpuint
                ret ; intelligent-mode commands handled here ...
mpuint:
                mov     ah,al
                mov     al,0feh
                call    MpuPutData
                ;
                cmp     ah,03fh
                jne     SHORT mitv
                bts     vFlags,UART_FLAG
dodx:
                bts     vFlags,MDATA_FLAG
                pushd   0ffffffffh
                call    _synth_all_notes_off
                add     esp,4
                mov     _num_active_voices,24
                mov     ActiveCount,200
                stc
                call    TimerCtl
                ret
mitv:
                cmp     ah,0ach
                jne     SHORT mitr
                mov     MpuData,15h
                bts     vFlags,DPEND_FLAG
                ret
mitr:
                cmp     ah,0adh
                jne     SHORT mitdx
                mov     MpuData,01h
                bts     vFlags,DPEND_FLAG
                ret
mitdx:
                and     ah,0f0h
                cmp     ah,0d0h
                je      SHORT dodx
                ret IoMpuCstat ENDP GetMscStat PROC push    edx
                mov     dx,[esi.ssi_wIOAddressGA]
                add     dl,MSCWBAK_OFF
                in      al,dx
                pop     edx
                ret GetMscStat ENDP SetMscStat PROC
```

```
                push    edx
                mov     dx,[esi.ssi_wIOAddressGA]
                add     dl,MSCWBAK_OFF
                out     dx,al
                pop     edx
                ret SetMscStat ENDP SblPutData PROC push    edx
                mov     dx,[esi.ssi_wIOAddressGA]
                add     dl,SBWBAK_OFF
                out     dx,al
                pop     edx
                push    eax
                call    GetMscStat
                or      al,SB_RXRDY
                call    SetMscSTat
                pop     eax
                ret SblPutData ENDP MpuPutData PROC push    edx
                mov     dx,[esi.ssi_wIOAddressGA]
                add     dl,MPUWBAK_OFF
                out     dx,al
                pop     edx
                push    eax
                call    GetMscStat
                and     al,NOT MPU_RXRDY
                call    SetMscSTat
                pop     eax
                ret MpuPutData ENDP ALIGN   4
                PUBLIC  IoSblReset
IoSblReset PROC test    ah,40h
                jnz     SHORT srout
                ret
srout:
                test    al,01h
                jz      SHORT sbres0
                ret
sbres0:
                mov     ax,((CD_CONFIG OR 40h) SHL 8) OR 04h
                call    CdCtrl
                mov     ax,(CD_PFORM SHL 8) OR 00h
                call    CdCtrl
                mov     ah,CD_CFORM
                call    CdCtrl
                mov     dx,[esi.ssi_wIOAddressCODEC]
                xor     al,al
                out     dx,al
                sub     dl,4
                out     dx,al mov     CmdProc,OFFSET ParseCmd
                mov     SbAccum,0aah
                mov     SbXorPat,96h
                mov     Tconst,0ffh
                mov     sbFlags,0
```

-40-

```
        stc
        call    MuteCtl
        call    HwCleanup
        mov     ax,(CD_PINCTL SHL 8) OR 0c2h
        call    CdWrite mov     al,0aah
        call    SblPutData
        ret
IoSblReset ENDP HwCleanup PROC push    eax
        push    edx mov     dx,[esi.ssi_wIOAddressCODEC]
        sub     dl,4
        xor     al,al
        out     dx,al mov     dx,[esi.ssi_wIOAddressGA]
        add     dl,CONTROL_OFF
        in      al,dx
        and     al,0f8h
        out     dx,al mov     ax,(CD_CONFIG SHL 8) OR 00h
        call    CdWrite
        mov     ah,CD_TINIT
        call    CdRead
        test    al,10h
        jz      SHORT drqok in      al,dx
        or      al,04h
        inc     dl
        in      al,dx
        out     dx,al
drqok:
        mov     dx,[esi.ssi_wIOAddressGA]
        add     dl,3
        in      al,dx
        out     dx,al
        dec     dl
        out     dx,al mov     dx,[esi.ssi_wIOAddressCODEC]
        add     dl,2
        in      al,dx pop     edx
        pop     eax
        ret HwCleanup ENDP ALIGN 4
        PUBLIC IoSblData
IoSblData PROC test    ah,40h                  ; data write?
        jnz     SHORT sdout
        btr     sbFlags,DPEND_SBFLAG    ; got a pending byte?
        jc      SHORT dpend
        call    GetMscStat
        and     al,NOT SB_RXRDY
        call    SetMscStat
        ret
```

```
dpend:
        xor     al,al
        call    SblPutData
        ret
sdout:
        ret IoSblData ENDP ALIGN 4
        PUBLIC IoSblCstat
IoSblCstat PROC test    ah,40h
        jnz     SHORT scout
        call    GetMscStat
        bt      sbFlags,CODECON_SBFLAG
        jnc     SHORT txnorm inc     Toggle                          ; if the DAC is on, we need to toggle
        test    Toggle,04h
        jz      SHORT txnorm
        or      al,SB_TXRDY
        call    SetMscStat
        ret
txnorm:                                         ; pass normal TxRdy
        and     al,NOT SB_TXRDY
        call    SetMscStat
        ret
scout:
        jmp     [CmdProc]                       ; go to current command process ParseCmd LABEL NEAR                             ; parse for a new command
        cmp     al,DACDMA_CMD
        jne     SHORT pcSetTc
dacdma:
        mov     [CmdProc],OFFSET GetDacCl
        ret pcSetTc:
        cmp     al,SETTC_CMD
        jne     SHORT pcDacIo
        mov     [CmdProc],OFFSET GetTc
        ret pcDacIo:
        cmp     al,DACIO_CMD
        jne     SHORT pcAdcIo
        bts     sbFlags,DACIO_SBFLAG
        jc      dioset
        mov     ax,((CD_CONFIG OR 40h) SHL 8) OR 45h
        call    CdCtrl
        mov     dx,[esi.ssi_wIOAddressCODEC]
        xor     al,al
        out     dx,al
        mov     ax,(CD_PINCTL SHL 8) OR 0c0h
        call    Cdwrite
        mov     ax,(CD_UFREQ SHL 8) OR 0c3h
        call    Cdwrite
        inc     ah
        call    Cdwrite
        mov     Tconst,0ffh
dioset:
        mov     [CmdProc],OFFSET GetDacIo
        ret pcAdcIo:
        cmp     al,DACIO_CMD
        jne     SHORT pcDacAon
        bts     sbFlags,ADCIO_SBFLAG
        jc      aioset
        mov     ax,((CD_CONFIG OR 40h) SHL 8) OR 86h
```

-42-

```
                call    CdCtrl
                mov     dx,[esi.ssi_wIOAddressCODEC]
                xor     al,al
                out     dx,al
                mov     ax,(CD_PINCTL SHL 8) OR 0c0h
                call    Cdwrite
                mov     ax,(CD_UFREQ SHL 8) OR 0c3h
                call    Cdwrite
                inc     ah
                call    Cdwrite
                mov     Tconst,0ffh
aioset:
                mov     dx,[esi.ssi_wIOAddressCODEC]
                add     dl,3
                in      al,dx
                call    SblPutData
                ret pcDacAon:
                cmp     al,DACAUTSTRT_CMD
                jne     SHORT pcAdcAon
dacauto:
                mov     ah,CD_PCOUNTL
                mov     al,AutoBlkL
                call    Cdwrite
                dec     ah
                mov     al,AutoBlkU
                call    Cdwrite
                mov     ax,((CD_CONFIG OR 00h) SHL 8) OR 01h
                call    CdCtrl
                bts     sbFlags,CODECON_SBFLAG
                ret pcAdcAon:
                cmp     al,ADCAUTSTRT_CMD
                jne     SHORT pcAutoOff
adcauto:
                mov     ah,CD_CCOUNTL
                mov     al,AutoBlkL
                call    Cdwrite
                dec     ah
                mov     al,AutoBlkU
                call    Cdwrite
                mov     ax,((CD_CONFIG OR 00h) SHL 8) OR 02h
                call    CdCtrl
                bts     sbFlags,CODECON_SBFLAG
                ret pcAutoOff:
                cmp     al,AUTOSTOP_CMD
                jne     SHORT pcAutoBlk
                push    eax
                push    edx
                mov     dx,[esi.ssi_wIOAddressCODEC]
                in      al,dx
                or      al,20h
                out     dx,al
                pop     edx
                pop     eax
                ret pcAutoBlk:
                cmp     al,AUTOBLK_CMD
                jne     SHORT pcHalt
                mov     [CmdProc],OFFSET GetAbL
                ret pcHalt:
                cmp     al,HALT_CMD
                jne     pcResum
                btr     sbFlags,CODECON_SBFLAG
                jnc     halted
                push    eax
```

-43-

```
                push    edx
                mov     ax,(CD_CONFIG SHL 8) OR 00h
                call    CdWrite
                mov     dx,[esi.ssi_wIOAddressCODEC]
                add     dl,2
                out     dx,al
                pop     edx
                pop     eax
halted:
                ret pcResum:
                cmp     al,RESUME_CMD
                jne     SHORT pcAdcDma
                bts     sbFlags,CODECON_SBFLAG
                jc      resumed
                push    eax
                mov     ax,(CD_CONFIG SHL 8) OR 01h
                call    CdWrite
                pop     eax
resumed:
                ret pcAdcDma:
                cmp     al,ADCDMA_CMD
                jne     SHORT pcItest
                mov     [CmdProc],OFFSET GetAdcCl
                ret pcItest:
                cmp     al,ITEST_CMD
                jne     SHORT pcSilence
                bts     sbFlags,ITEST_SBFLAG
                push    eax
                push    edx
                mov     dx,[esi.ssi_wIOAddressCODEC]
                sub     dx,4
                mov     al,40h
                out     dx,al
                pop     edx
                pop     eax
                ret pcSilence:
                cmp     al,SILENCE_CMD
                jne     pcSpkrOn
                mov     CmdProc,GetSilCl
                ret pcSpkrOn:
                cmp     al,SPKRON_CMD
                jne     SHORT pcSpkrOff
                clc
                call    MuteCtl
                ret pcSpkrOff:
                cmp     al,SPKROFF_CMD
                jne     SHORT pcGetSpkr
                stc
                call    MuteCtl
                ret pcGetSpkr:
                cmp     al,GETSPKR_CMD
                jne     SHORT pcScram
                mov     al,SpkrStat
                call    SblPutData
                ret pcScram:
                cmp     al,SCRAMBLE_CMD
                jne     SHORT pcGetVer
```

-44-

```
              mov       [CmdProc],OFF. GetScram
              ret
pcGetVer:
              cmp       al,GETVER_CMD
              jne       SHORT pcInvByte
              mov       al,02h
              call      SblPutData
              bts       sbFlags,DPEND_SBFLAG
              ret pcInvByte:
              cmp       al,INVBYTE_CMD
              jne       SHORT pcSetTag
              mov       CmdProc,OFFSET GetInv
              ret pcSetTag:
              cmp       al,SETTAG_CMD
              jne       SHORT pcGetTag
              mov       CmdProc,OFFSET GetTag
              ret pcGetTag:
              cmp       al,GETTAG_CMD
              jne       SHORT pcCmpS
              mov       al,TagByte
              call      SblPutData
              ret pcCmpS:
              cmp       al,DAC84DMA_CMD
              jne       SHORT pcCS1
              jmp       SHORT pcCSgo
pcCS1:
              cmp       al,DAC84DMAR_CMD
              jne       SHORT pcCS2
              jmp       SHORT pcCSgo
pcCS2:
              cmp       al,DAC83DMA_CMD
              jne       SHORT pcCS3
              jmp       SHORT pcCSgo
pcCS3:
              cmp       al,DAC83DMAR_CMD
              jne       SHORT pcCS4
              jmp       SHORT pcCSgo
pcCS4:
              cmp       al,DAC82DMAR_CMD
              jne       SHORT pcCS5
              jmp       SHORT pcCSgo
pcCS5:
              cmp       al,DAC82DMAR_CMD
              jne       SHORT pcCmpA
pcCSgo:
              stc
              call      MuteCtl
              jmp       dacdma pcCmpA:
              cmp       al,DAC84AUTO_CMD
              jne       SHORT pcCA1
              jmp       SHORT pcCAgo
pcCA1:
              cmp       al,DAC83AUTO_CMD
              jne       SHORT pcCA2
              jmp       SHORT pcCAgo
pcCA2:
              cmp       al,DAC82AUTO_CMD
              jne       SHORT pcNone
pcCAgo:
              stc
              call      MuteCtl
              jmp       dacauto
```

```
PcNone:
        ret

GetAdcCl:
        mov     ah,CD_CCOUNTL
        call    CdWrite
        mov     [CmdProc],OFFSET GetAdcCu
        ret GetAdcCu:                                       ; this process starts the ADC
        mov     ah,CD_CCOUNTU
        call    CdWrite
        bts     sbFlags,CODECON_SBFLAG
        jc      adcson
        mov     ax,((CD_CONFIG OR 20h) SHL 8) OR 02h
        call    CdCtrl
adcson:
        mov     CmdProc,OFFSET ParseCmd
        ret GetDacIo:
        push    edx
        mov     dx,[esi.ssi_wIOAddressCODEC]
        add     dl,3
        out     dx,al
        pop     edx
        mov     CmdProc,OFFSET ParseCmd
        ret GetSilCl:
        mov     DmaCountL,al
        mov     CmdProc,OFFSET GetSilCu
        ret GetSilCu:
        mov     DmaCountU,al
        xor     ecx,ecx                         ; derive otto sample count
        mov     cx,DmaCount
        inc     ecx
        mov     eax,31250
        xor     edx,edx
        mul     ecx
        xor     ecx,ecx
        mov     cx,SbSrate
        xor     edx,edx
        div     ecx
        inc     eax
        shl     eax,11                          ; create a loop-end value push    eax
        push    3eh                             ; addr page
        call    _otto_io_page
        add     esp,4
        ;
        push    08h                             ; set loop-end (eax pre-pushed)
        call    _otto_io_write
        add     esp,8
        ;
        push    1eh                             ; freq page
        call    _otto_io_page
        add     esp,4
        ;
        pushd   0ff20h                          ; non-looping, int enable
        push    00h
        call    _otto_io_jam
        add     esp,8 pushd   0800h                           ; frequency is 1
        push    04h
        call    _otto_io_write
        add     esp,8
```

-46-

```
                mov     CmdProc,OFFSET ParseCmd
                ret
GetDacCl:
                mov     ah,CD_PCOUNTL
                call    CdWrite
                mov     [CmdProc],OFFSET GetDacCu
                ret
GetDacCu:                               ; this process starts the DAC
                mov     ah,CD_PCOUNTU
                call    CdWrite
                bts     sbFlags,CODECON_SBFLAG
                jnc     dacst
                ;
                mov     dx,[esi.ssi_wIOAddressCODEC]
                add     dl,2
                in      al,dx
                test    al,01h
                jz      SHORT dacex
                mov     ax,(CD_CONFIG SHL 8) OR 00h
                call    CdWrite
                out     dx,al
dacst:
                mov     ax,((CD_CONFIG OR 20h) SHL 8) OR 01h
                call    CdCtrl
dacex:
                mov     CmdProc,OFFSET ParseCmd
                ret GetAbL:
                mov     AutoBlkL,al
                mov     [CmdProc],OFFSET GetAbU
                ret GetAbU:
                mov     AutoBlkU,al
                mov     CmdProc,OFFSET ParseCmd
                ret GetTc:
                call    SetRate
                mov     CmdProc,OFFSET ParseCmd
                ret GetScram:
                xor     al,SbXorPat
                add     al,SbAccum
                mov     dx,[esi.ssi_wIOAddressGA]
                add     dl,JAMDATA_OFF
                out     dx,al
                mov     SbAccum,al
                ror     SbXorPat,2
                dec     dl
                in      al,dx
                or      al,02h
                out     dx,al
                mov     CmdProc,OFFSET ParseCmd
                ret GetInv:
                not     al
                call    SblPutData
                mov     CmdProc,OFFSET ParseCmd
                ret GetTag:
                mov     TagByte,al
                mov     CmdProc,OFFSET ParseCmd
                ret IoSblCstat ENDP
```

```
        ALIGN 4
        PUBLIC IoSblRxrdy
IoSblRxrdy PROC test    ah,40h
        jnz     srxout mov     dx,[esi.ssi_wIOAddressCODEC]
        add     dl,2
        in      al,dx
        test    al,01h
        jz      SHORT notcd sub     dl,2
        in      al,dx
        test    al,20h
        jz      clrint
        mov     ax,(CD_CONFIG SHL 8) OR 00h
        call    Cdwrite
        btr     sbFlags,CODECON_SBFLAG
clrint:
 mov ah,18h
 call CdRead
 or al,80h
 call DbPut8
        add     dl,2
        out     dx,al                   ; clear CoDec int
 mov ah,18h
 call CdRead
 call DbPut8
        jmp     SHORT rxstat
notcd:
        btr     sbFlags,ITEST_SBFLAG    ; did we fire-off a test int?
        jnc     rxstat
        sub     dl,6
        xor     al,al
        out     dx,al                   ; kill forced IRQ
rxstat:
        ret
srxout:
        ret IoSblRxrdy ENDP ALIGN 4
        PUBLIC IoFmAstat
IoFmAstat PROC test    ah,40h
        jnz     SHORT faout
        btr     vFlags,FMDET_FLAG
        jnc     SHORT farex
        pushd   0ffffffffh
        call    _synth_all_notes_off
        add     esp,4
        mov     _num_active_voices,12
farex:
        ret
faout:
        mov     FmAddr,al               ; FM address reg write
        ret IoFmAstat ENDP ALIGN 4
        PUBLIC IoFmData
IoFmData PROC test    ah,40h                  ; writing fm data port?
```

-48-

```
            jnz        SHORT fdout
            mov        al,0ffh
            ret
fdout:
            xor        edx,edx                    ; FM data reg write
            mov        dl,FmAddr
            mov        _fm_array[edx],al          ; fill-in FM data array
            mov        dh,dl
            cmp        dh,01h
            je         SHORT fmdenq
            and        dh,0f0h
            cmp        dh,0b0h                    ; need to process FM notes?
            jne        SHORT fmtdet
fmdenq:
            cmp        ActiveCount,0              ; make sure timer is on
            mov        ActiveCount,200
            jne        SHORT fmcall
            stc
            call       TimerCtl
fmcall:
            push       edx
            call       _fm_process
            add        esp,4
            ret
fmtdet:
            cmp        FmAddr,4                   ; test for timer detection
            jne        SHORT fmdex
            mov        ah,al
            call       GetMscStat
fmdt1:
            test       ah,T1_TRIG
            jz         SHORT fmdt2
            or         al,T1_IRQ OR FM_IRQ
            bts        vFlags,FMDET_FLAG
fmdt2:
            test       ah,T2_TRIG
            jz         SHORT fmdm1
            or         al,T2_IRQ OR FM_IRQ
            bts        vFlags,FMDET_FLAG
fmdm1:
            test       ah,T1_MASK
            jz         SHORT fmdm2
            and        al,NOT T1_IRQ
fmdm2:
            test       ah,T2_MASK
            jz         SHORT fmdtr
            and        al,NOT T2_IRQ
fmdtr:
            test       al,T1_IRQ OR T2_IRQ
            jnz        SHORT fmdstat
            and        al,NOT FM_IRQ
fmdstat:
            call       SetMscStat
fmdex:
            ret IoFmData ENDP ALIGN 4
        PUBLIC IoCdAddr
IoCdAddr PROC test       ah,40h
            jnz        SHORT caout
            ret
caout:
            mov        CdAddr,al
            ret IoCdAddr ENDP
```

-49-

```
        ALIGN 4
        PUBLIC IoCdData
IoCdData PROC test    ah,40h
        jnz     SHORT cdout
        mov     ah,CdAddr
        and     ah,1fh
        cmp     ah,CD_MISC
        jne     SHORT cdrex
        mov     BYTE PTR [esp+4],0ah
        cmp     wssSwtch,0
        jne     SHORT cdrex
        mov     BYTE PTR [esp+4],0ffh
cdrex:
        ret
cdout:
        mov     ah,CdAddr
        and     ah,1fh
        cmp     ah,CD_PFORM
        jne     SHORT cdtpin
        xor     edx,edx
        mov     dl,al
        and     dl,0fh
        mov     dx,FreqTable[2*edx]
        mov     ah,CD_UFREQ
        mov     al,dh
        call    Cdwrite
        inc     ah
        mov     al,dl
        call    Cdwrite
        ret
cdtpin:
        cmp     ah,CD_PINCTL
        jne     SHORT cdtmsc
        or      al,0c0h
        call    Cdwrite
        ret
cdtmsc:
        cmp     ah,CD_MISC
        jne     SHORT cdtlcc
        mov     al,50h
        call    Cdwrite
        ret
cdtlcc:
        cmp     ah,CD_CCOUNTL
        jne     SHORT cdtucc
        mov     ah,CD_PCOUNTL
        call    Cdwrite
        ret
cdtucc:
        cmp     ah,CD_CCOUNTU
        jne     SHORT cdwex
        mov     ah,CD_PCOUNTU
        call    Cdwrite
cdwex:
        ret IoCdData ENDP ALIGN 4
        PUBLIC IoWss
IoWss   PROC test    ah,40h
        jnz     SHORT wsout
        cmp     wssSwtch,0
        jne     SHORT wiwss
        mov     BYTE PTR [esp+4],0ffh
wiwss:
        ret
wsout:
```

```
            cmp     wssSwtch,0
            jne     SHORT wopass
            xor     al,al
            out     dx,al
wopass:
            ret IoWss       ENDP ALIGN 4
            PUBLIC IoPass
IoPass      PROC ret IoPass      ENDP IF WIN_CODE
VxD_LOCKED_CODE_ENDS
VxD_LOCKED_DATA_SEG
            ENDIF

ALIGN 4

IFE WIN_CODE
            PUBLIC gpSSI
gpSSI           DD OFFSET HwConfig
            IFDEF DOS_DEBUG
DebugPtr        DD (0b0000h + 2*80*8)
            ENDIF
            ENDIF MpuTable        LABEL DWORD
                DD IoMpuData,   IoMpuCstat SblTable        LABEL DWORD
                DD IoPass,      IoPass,         IoPass,         IoPass
                DD IoPass,      IoPass,         IoSblReset,     IoPass
                DD IoFmAstat,   IoFmData,       IoSblData,      IoPass
                DD IoSblCstat,  IoPass,         IoSblRxRdy,     IoPass AdlTable        LABEL DWORD
                DD IoFmAstat,   IoFmData,       IoPass,         IoPass CdTable         LABEL DWORD
                DD IoWss,       IoWss,          IoWss,          IoWss
                DD IoCdAddr,    IoCdData,       IoPass,         IoPass SystemTime      DD 0

ClientCr3       DD ?
ClientTab       LABEL FWORD
CTlimit         DW ?
CTladdr         DD ?
RegSave         DD ?

PmDest          LABEL FWORD
PDoffset        DD ?
PDselector      DW ?

SaveGentries    DD 6 DUP(?)

CmdProc         DD OFFSET ParseCmd

MidiMessage     LABEL DWORD
MidiStat        DB 80h
MidiData        DB 00h, 00h, 00h FreqTable       LABEL WORD
                DW 8000,        5513,           16000,          11025
```

```
                DW 27429,    18900,    32000,    22050
                DW 22050,    37800,    37800,    44100
                DW 48000,    33075,    9600,     6615

IFE WIN_CODE
        ALIGN 4
                    DB 256 DUP(0eeh)
StackTop        LABEL NEAR
LocalStack      LABEL FWORD
LSoffset        DD OFFSET StackTop
LSselector      DW ?
SpSave          LABEL FWORD
SSoffset        DD ?
SSselector      DW ?

ENDIF

PUBLIC vFlags
vFlags          DW 0000h
sbFlags         DW 0000h
SbSrate         DW 11025
DmaCount        LABEL WORD
DmaCountL       DB 0
DmaCountU       DB 0
AutoBlk         LABEL WORD
AutoBlkL        DB 10h
AutoBlkU        DB 00h PageRegs        DB 87h, 83h, 81h, 82h MidiDatC        DB 1
MidiCurC        DB 0

MpuData         DB 00h
MpuStat         DB 10111111b
        IF WIN_CODE
        PUBLIC ExtMidi
ExtMidi         DB 0
        PUBLIC _SynthVolL
_SynthVolL      DB 7fh
        PUBLIC _SynthVolR
_SynthVolR      DB 7fh
        ENDIF TagByte         DB 80h
Toggle          DB 0
SpkrStat        DB 00h
SbAccum         DB 0aah
SbXorPat        DB 96h Tconst          DB 0ffh FmAddr          DB 01h
FmStat          DB 06h CdAddr          DB 40h
WssSwtch        DB 00h StkSwtch        DB 00h PUBLIC ActiveCount
ActiveCount     DB ?

IFDEF DOS_DEBUG
DebugByte       DB '0'
        ENDIF

IF WIN_CODE
VxD_LOCKED_DATA_ENDS
        ELSE
_TEXT   ENDS
        ENDIF
```

END

APPENDIX B

© 1996 ENSONIQ

```
        .386p

INCLUDE vivo.inc

NUM_CODEPAGES   EQU 25

NMI_INT         EQU 02h
TIMER_INT       EQU 08h

DOS_SETVECT     EQU 25h
DOS_TSR         EQU 31h
DOS_GETVECT     EQU 35h
DOS_FREE        EQU 49h
DOS_MODIFY      EQU 4ah

PARMBLK STRUCT
        envseg   WORD   ?
        cmdoff   WORD   ?
        cmdseg   WORD   ?
        fcb1off  WORD   ?
        fcb1seg  WORD   ?
        fcb2off  WORD   ?
        fcb2seg  WORD   ?
PARMBLK ENDS

_TEXT   SEGMENT DWORD PUBLIC USE16 'CODE'

ASSUME cs:_TEXT, ds:_TEXT

ORG 0100h

Start:
    jmp Entry

; Resident Data (non-discardable) starts here

ALIGN 2
FromScope       LABEL NEAR
VivoGentries    DD 6 DUP(?)
XmsPaddr        LABEL DWORD
XPlower         DW ?
XPupper         DW ?
NumCodePages    DW 0000h HwConfig        LABEL NEAR
BasePort        DW 0000h
WavePort        DW ?
OttoPort        DW ?
WaveIrq         DB ?
MidiIrq         DB ?
DmaChan         DB ?
ExtMidi         DB ?
SbEnable        DB ?
SynthVol        DB ?
WaveVol         DB ?
CdAuxVol        DB ?
BoardType       DB ?

ALIGN 2
SharedData      LABEL NEAR
Int67Return     LABEL DWORD
I67Roffset      DW ?
I67Rsegment     DW ?
V86Return       LABEL DWORD
V86Roffset      DW ?
V86Rsegment     DW ?
GetPmiDi        DW ?
```

-54-

```
DosLink         LABEL DWORD
DLoffset        DW ?
DLsegment       DW ?

MuxLink         LABEL DWORD
MLoffset        DW ?
MLsegment       DW ?

TimerLink       LABEL DWORD
TLoffset        DW ?
TLsegment       DW ?

Flags           DW 0
FLAG_WIN        EQU 0

MidiPic         DW 0021h
MidiVect        DB 08h
MidiUnmask      DB ?

IFDEF DOS_DEBUG
DebugPtr        DW 2*(80*0 + 0)
        ENDIF

; Resident Code (non-discardable) starts here

IFDEF DOS_DEBUG
DbPutCh PROC push    es
        push    di mov     di,0b000h ; apw
        mov     es,di
        mov     di,cs:DebugPtr
        mov     es:[di],al
        add     cs:DebugPtr,4 pop     di
        pop     es
        ret

DbPutCh ENDP

DbPutByte PROC push    cx
        push    dx
        push    di
        push    es mov     di,cs:DebugPtr
        mov     dx,0b000h
        mov     es,dx
        mov     cx,2
@@1:
        rol     al,4
        mov     dl,al
        and     dl,0fh
        cmp     dl,0ah
        jb      @@2
        add     dl,'A' - 0ah
        jmp     SHORT @@3
@@2:
        add     dl,'0'
@@3:
        mov     es:[di],dl
        add     di,2
        cmp     di,2*80*24
        jb      nba
        xor     di,di
nba:
```

```
            loop    @@1
            mov     BYTE PTR es:[di],' '
            add     di,2
            cmp     di,2*80*24
            jb      nbb
            xor     di,di
nbb:
            mov     BYTE PTR es:[di],'*'
            mov     cs:DebugPtr,di pop     es
            pop     di
            pop     dx
            pop     cx
            ret DbPutByte ENDP DbPutWord PROC push    cx
            push    dx
            push    di
            push    es mov     di,cs:DebugPtr
            mov     dx,0b000h
            mov     es,dx
            mov     cx,4
@@1:
            rol     ax,4
            mov     dl,al
            and     dl,0fh
            cmp     dl,0ah
            jb      @@2
            add     dl,'A' - 0ah
            jmp     SHORT @@3
@@2:
            add     dl,'0'
@@3:
            mov     es:[di],dl
            add     di,2
            cmp     di,2*80*24
            jb      nwa
            xor     di,di
nwa:
            loop    @@1 mov     BYTE PTR es:[di],' '
            add     di,2
            cmp     di,2*80*24
            jb      nwb
            xor     di,di
nwb:
            mov     BYTE PTR es:[di],'*'
            mov     cs:DebugPtr,di pop     es
            pop     di
            pop     dx
            pop     cx
            ret DbPutWord ENDP
            ENDIF NmiIsr  PROC FAR push    ax
            push    dx
```

-56-

```
            mov     dx,cs:BasePort
            add     dl,NMISTAT_OFF
            in      al,dx
            in      al,61h
            and     al,0fh
            or      al,08h
            out     61h,al
            and     al,07h
            out     61h,al
            pop     dx
            pop     ax
            iret NmiIsr  ENDP MidiIsr PROC FAR bt      cs:Flags,FLAG_WIN
            jnc     midoit
            iret
midoit:
            push    ax
            push    bx
            mov     ax,0dee1h
            mov     bh,00h
            int     67h
            pop     bx
            pop     ax
miexit:
            iret MidiIsr ENDP DosIsr  PROC FAR bt      cs:Flags,FLAG_WIN
            jnc     didoit
            jmp     cs:DosLink
didoit:
            cmp     ah,DOS_SETVECT
            je      disvect
            jmp     cs:DosLink
disvect:
            cmp     al,02h
            je      diskip
            cmp     al,cs:Midivect
            je      diskip
            jmp     cs:DosLink
diskip:
            iret DosIsr  ENDP MuxIsr  PROC FAR pushf
            cmp     ax,1605h
            je      wstrt
            cmp     ax,1606h
            je      wstop
milink:
            popf
            jmp     cs:MuxLink
wstrt:
            bts     cs:Flags,FLAG_WIN
            push    ax
            push    dx
            mov     dx,cs:BasePort
            add     dl,CONTROL_OFF
            xor     al,al
```

-57-

```
                out     dx,al
                add     dl,NMICTL_OFF-CONTROL_OFF
                out     dx,al
                pop     dx
                pop     ax
                jmp     milink
wstop:
                btr     cs:Flags,FLAG_WIN
                push    ax
                push    dx
                ;
                mov     dx,cs:WavePort
                mov     al,40h OR CD_CONFIG
                out     dx,al
                inc     dl
                mov     al,04h
                out     dx,al
                dec     dl
                mov     al,CD_ADLVOL
                out     dx,al
                inc     dl
                mov     al,8ch
                dec     dl
                mov     al,CD_ADRVOL
                out     dx,al
                inc     dl
                mov     al,8ch
                ;
                mov     dx,cs:BasePort
                add     dl,CONTROL_OFF
                mov     al,08h
                out     dx,al
                add     dl,NMICTL_OFF-CONTROL_OFF
                mov     al,0a0h
                cmp     cs:SbEnable,00h
                je      wnosb
                or      al,40h
wnosb:
                out     dx,al
                ;
                pop     dx
                pop     ax
                jmp     milink MuxIsr  ENDP TimerIsr PROC FAR bt      cs:Flags,FLAG_WIN
                jnc     tidoit
                jmp     cs:TimerLink
tidoit:
                push    ax
                push    dx
                mov     dx,cs:MidiPic
                in      al,dx
                and     al,cs:MidiUnmask
                out     dx,al
                ;
                in      al,61h
                and     al,07h
                out     61h,al
                ;
                xor     al,al
                out     70h,al
                pop     dx
                pop     ax
                jmp     cs:TimerLink TimerIsr ENDP
```

```
GetPmi:
        push    eax
        push    cx
        ;
        mov     eax,cs:XmsPaddr
        shr     eax,10
        and     al,0fch
        add     ax,cs:GetPmiDi
i67pla:
        mov     DWORD PTR es:[di],0fffff067h
        add     di,4
        cmp     di,ax
        jb      i67pla
        ;
        mov     eax,cs:XmsPaddr
        mov     al,67h
        mov     cx,cs:NumCodePages
i67plb:
        mov     es:[di],eax
        add     di,4
        add     eax,1000h
        loop    i67plb
        ;
        mov     bx,OFFSET VivoGentries
        mov     cx,6
i67glp:
        mov     eax,cs:[bx]
        add     bx,4
        mov     [si],eax
        add     si,4
        loop    i67glp
        sub     si,24
        ;
        mov     ebx,14h
        pop     cx
        pop     eax
        jmp     cs:Int67Return Fixup:
        mov     ax,0dee0h
        int     67h
        jmp     cs:V86Return TsrEnd  LABEL NEAR ; Init Data (discardable) starts here ALIGN 2
XmsEntry        LABEL DWORD         ; XMS far-call entry point
XEoffset        DW ?
XEsegment       DW ?
XmsHandle       DW ?                ; our XMS chunk handle ToScope         LABEL NEAR          ; discardable data sent to SCOPE.EXE
EmmCr3          DD ?
EmmGdt          DF ?
EmmIdt          DF ?
                DW OFFSET FromScope
                DW OFFSET HwConfig
                DW OFFSET GetPmi
                DW OFFSET Fixup
                DW OFFSET SharedData ; param struct for .EXE spawning
ParamBlock      PARMBLK < ?, OFFSET Param, ?, 5ch, ?, 6ch, ? >

FileHandle      DW 0
SsPath          DB 65 DUP(?)
Vscape32        DB '\VSCAPE32.BIN',0
SsConfig        DB '\SSCONFIG.EXE',0
Scope           DB '\SCOPE.EXE',0
Dos4GW          DB '\DOS4GW.EXE',0
```

-59-

```
Quiet       DB  'DOS4G=QUIL',0
Param       DB  127 DUP(' ')
TmpBuff     DB  128 DUP(?)

; Init Code (discardable) starts here
        IFDEF DOS_DEBUG
PrintChar PROC push    ax
        push    dx
        mov     dl,al
        mov     ah,02h
        int     21h
        pop     dx
        pop     ax
        ret PrintChar ENDP PrintWord PROC push    ax
        push    cx
        push    dx mov     cx,4
@@1:
        rol     ax,4
        mov     dl,al
        and     dl,0fh
        cmp     dl,0ah
        jb      @@2
        add     dl,'A' - 0ah
        jmp     SHORT @@3
@@2:
        add     dl,'0'
@@3:
        push    ax
        mov     al,dl
        call    PrintChar
        pop     ax
        loop    @@1
        rol     ax,4 pop     dx
        pop     cx
        pop     ax
        ret

PrintWord ENDP

PrintRet PROC push    ax
        push    dx mov     ah,02h
        mov     dl,0dh
        int     21h
        mov     dl,0ah
        int     21h pop     dx
        pop     ax
        ret PrintRet ENDP
```

```
PrintStr PROC push    ax
        push    dx
        push    di
        mov     ah,02h
@@1:
        mov     dl,es:[di]
        inc     di
        or      dl,dl
        jz      @@2
        int     21h
        jmp     SHORT @@1
@@2:
        pop     di
        pop     dx
        pop     ax
        ret PrintStr ENDP
        ENDIF PrintMsg PROC push    bp
        mov     bp,sp
        push    ax
        push    dx
        push    si mov     si,[bp+2]
        mov     ah,02h
@@1:
        mov     dl,[si]
        inc     si
        or      dl,dl
        jz      @@2
        int     21h
        jmp     SHORT @@1
@@2:
        mov     [bp+2],si pop     si
        pop     dx
        pop     ax
        pop     bp
        ret PrintMsg ENDP WordToStr PROC push    cx
        push    dx mov     cx,4
@@1:
        rol     ax,4
        mov     dl,al
        and     dl,0fh
        cmp     dl,0ah
        jb      @@2
        add     dl,'A' - 0ah
        jmp     SHORT @@3
@@2:
        add     dl,'0'
@@3:
        mov     es:[di],dl
        inc     di
        loop    @@1
```

-61-

```
                mov     BYTE PTR es:[    ,0
                inc     di pop     dx
                pop     cx
                ret wordToStr       ENDP ; StrCpy
;
; Inputs: ds:si - source string
;         es:di - destination string
; Return: Nothing. All regs are left unaffected except ...
;         di - this will point to the byte immediately following the last
;         destination byte that was copied to.
;
StrCpy          PROC push    ax              ; save regs
                push    si
@@1:
                mov     al,[si]         ; copy the string
                mov     es:[di],al
                inc     si
                inc     di
                cmp     al,0
                jne     @@1 pop     si              ; restore regs and exit
                pop     ax
                ret StrCpy          ENDP Entry:
                ; string ops forward always
                cld ; print a hello dorks message
                call    PrintMsg
                DB      0dh,0ah,' SoundscapeVIVO(TM) Initialization Driver, Version 3.22.',0dh,0ah
                DB      ' Copyright(c) 1995-1996, ENSONIQ Corp., All Rights Reserved.',0dh,0ah,0

; if we need to, free all but our 64k so we can spawn later
                mov     ax,sp
                cmp     ax,0fffeh
                jne     csizok
                mov     bx,cs
                mov     es,bx
                mov     bx,1000h
                mov     ah,DOS_MODIFY
                int     21h
csizok:
                ; see if loader is command shell - if not, assume .com and resize
                mov     ax,cs:[0016h]
                mov     es,ax
                mov     bx,es:[0016h]
                cmp     ax,bx
                je      psizok
                mov     es,ax
                mov     bx,1000h
                mov     ah,DOS_MODIFY
                int     21h
psizok:
                ; get the int 67 vector, make sure we got a memory manager
                mov     ax,(DOS_GETVECT SHL 8) OR 67h
                int     21h
                mov     ax,es
                or      ax,ax
                jnz     emvok
```

-62-

```
                call    PrintMsg
                DB      0dh,0ah,07h,' error: Memory Manager not detected.',0dh,0ah
                DB      '        SoundscapeVIVO requires EMM386 or similar.',0dh,0ah,0
                jmp     exit
emvok:
                ; see if we're already loaded
                mov     ax,0dee1h
                mov     bx,0b55h
                int     67h
                cmp     bl,0aah
                jne     ssnpres
                call    PrintMsg
                DB      0dh,0ah,' ... SoundscapeVIVO driver is currently loaded ...',0dh,0ah,0
                jmp     exit
ssnpres:
                ; locate our path and save it
                xor     di,di
                mov     es,cs:[002ch]
                mov     cx,0ffffh
                xor     al,al
envlp:
                repne   scasb
                cmp     al,es:[di]
                jne     SHORT envlp
                mov     bx,di
                add     di,3 push    ds
                mov     si,di
                mov     ax,es
                mov     ds,ax
                mov     di,OFFSET SsPath
                mov     ax,cs
                mov     es,ax
                call    StrCpy
                pop     ds
                ;
                mov     di,OFFSET SsPath
                xor     al,al
                repne   scasb
                pushf
                std
                mov     al,'\'
                repne   scasb
                popf
                inc     di
                mov     BYTE PTR [di],0

; set the local quiet environment var for 4GW spawn
                mov     di,bx
                mov     es,cs:[002ch]
                mov     si,OFFSET Quiet
                call    StrCpy
                mov     BYTE PTR es:[di],0

; build the parameter line for config spawn
                mov     di,OFFSET Param+2
                mov     ax,ds
                mov     es,ax
                mov     ax,OFFSET HwConfig
                call    wordToStr               ; setup config offset arg
                mov     BYTE PTR [di-1],' '
                mov     ax,ds
                call    wordToStr               ; setup segment arg
                mov     BYTE PTR [di-1],0dh
                sub     di,OFFSET Param+2       ; add length
                mov     ax,di
                mov     Param,al ; build the filename for the config code
                mov     si,OFFSET SsPath
                mov     di,OFFSET TmpBuff
                mov     dx,ds
```

-63-

```
                mov     es,dx                   ; first copy path
                call    StrCpy
                dec     di
                mov     si,OFFSET SsConfig      ; append filename
                call    StrCpy mov     bx,OFFSET ParamBlock    ; setup param block
                mov     ax,cs:[002ch]
                mov     (PARMBLK PTR [bx]).envseg,ax
                mov     (PARMBLK PTR [bx]).cmdseg,ds
                mov     (PARMBLK PTR [bx]).fcb1seg,ds
                mov     (PARMBLK PTR [bx]).fcb2seg,ds
                mov     dx,OFFSET TmpBuff
                mov     ax,ds
                mov     es,ax
                mov     ax,4b00h                ; and spawn the .exe
                int     21h
                jnc     cfgran
                call    PrintMsg
                DB 0dh,0ah,07h,' error: Could not execute SSCONFIG.EXE.',0dh,0ah,0
                jmp     exit
cfgran:
                cmp     BasePort,0
                jne     cfgok
                jmp     exit
cfgok:
                ; see if we have to bail now ...
                mov     di,0080h
                xor     cx,cx
                mov     cl,[di]                 ; look for /N cmd line arg
                or      cl,cl
                jz      nokill
                dec     cx
                inc     di
                mov     ax,ds
                mov     es,ax
                mov     al,'/'
                repne   scasb
                jnz     nokill
                mov     al,[di]
                and     al,0dfh
                cmp     al,'N'
                jne     nokill
                call    PrintMsg
                DB 0dh,0ah,' Initialization Complete, DOS drivers NOT loaded.',0dh,0ah,0dh,0ah,0
                jmp     exit
nokill:
                ; setup some HW-dependent vars
                mov     cl,MidiIrq
                cmp     cl,08h
                jb      mvrset
                mov     MidiPic,00a1h
                mov     MidiVect,70h
mvrset:
                and     cl,07h
                add     MidiVect,cl
                mov     al,1
                shl     al,cl
                not     al
                mov     MidiUnmask,al ; see if we have an XMS driver
                mov     ax,4300h
                int     2fh
                cmp     al,80h
                je      xmspr
                call    PrintMsg
                DB 0dh,0ah,07h,' error: XMS services were not detected.',0dh,0ah,0
                jmp     exit
xmspr:
                ; get the XMS control function entry point
                mov     ax,4310h
                int     2fh
```

-64-

```
            mov     XEoffset,bx
            mov     XEsegment,es

; get enough XMS for our 32-bit code
            mov     dx,(4 * NUM_CODEPAGES)
            mov     ah,09h
            call    XmsEntry
            or      ax,ax
            jnz     xmsok
            call    PrintMsg
            DB 0dh,0ah,07h,' error: Could not allocate required Extended Memory.',0dh,0ah,0
            jmp     exit
xmsok:
            ; lock the XMS block (handle in dx), save phys addr
            mov     ah,0ch
            call    XmsEntry
            or      ax,ax
            jnz     xmlok
            call    PrintMsg
            DB 0dh,0ah,07h,' error: Could not lock Extended Memory.',0dh,0ah,0
            jmp     xfexit
xmlok:
            mov     XPlower,bx
            mov     XPupper,dx ; make sure we're below 4M
            mov     eax,XmsPaddr
            add     eax,((NUM_CODEPAGES SHL 12) - 1)
            cmp     eax,400000h
            jb      xm4ok
            call    PrintMsg
            DB 0dh,0ah,07h,' error: Could not allocate Extended Memory below 4 Mbyte boundary.'
,0dh,0ah
            DB '         Try loading SSINIT.COM before SMARTDRV.EXE',0dh,0ah,0
fxexit:
            jmp     xuexit
xm4ok:
            ; get the EMM386 environment and data for scope.exe
            mov     eax,cr3
            mov     EmmCr3,eax
            sgdt    EmmGdt
            sidt    EmmIdt ; build the parameter line for scope spawn
            mov     di,OFFSET Param+2
            mov     ax,ds
            mov     es,ax
            mov     si,OFFSET SsPath        ; setup fpath and fname for DOS4GW
            call    StrCpy
            dec     di
            mov     si,OFFSET Scope
            call    StrCpy
            mov     BYTE PTR [di-1],' '
            mov     BYTE PTR [di],0
            mov     ax,OFFSET ToScope
            call    WordToStr               ; setup data-out offset arg
            mov     BYTE PTR [di-1],' '
            mov     ax,ds
            call    WordToStr               ; setup segment arg
            mov     BYTE PTR [di-1],0dh
            sub     di,OFFSET Param+2       ; add length
            mov     ax,di
            mov     Param,al ; build the filename for the scope (DOS4GW) code
            mov     si,OFFSET SsPath
            mov     di,OFFSET TmpBuff
            mov     dx,ds
            mov     es,dx                   ; first copy path
            call    StrCpy
            dec     di
            mov     si,OFFSET Dos4GW        ; append filename
            call    StrCpy
```

-65-

```
            mov     bx,OFFSET ParamBlock    ; setup param block
            mov     dx,OFFSET TmpBuff
            mov     ax,ds
            mov     es,ax
            mov     ax,4b00h                ; and spawn the .exe
            int     21h
            jnc     scpran
            call    PrintMsg
            DB      0dh,0ah,07h,' error: Could not execute SCOPE.EXE.',0dh,0ah,0
            jmp     fxexit
scpran:
            cmp     NumCodePages,0
            jne     scpok
            jmp     fxexit
scpok:
            mov     dx,OFFSET NmiIsr        ; install NMI service
            mov     ax,(DOS_SETVECT SHL 8) OR 02h
            int     21h
            mov     dx,OFFSET MidiIsr       ; install MIDI IRQ service
            mov     al,Midivect
            int     21h mov     ax,(DOS_GETVECT SHL 8) OR 21h
            int     21h                     ; save DOS vector
            mov     DLoffset,bx
            mov     DLsegment,es
            mov     dx,OFFSET DosIsr        ; install our DOS service
            mov     ah,DOS_SETVECT
            int     21h mov     ax,(DOS_GETVECT SHL 8) OR 2fh
            int     21h                     ; save Mux vector
            mov     MLoffset,bx
            mov     MLsegment,es
            mov     dx,OFFSET MuxIsr        ; install our Mux service
            mov     ah,DOS_SETVECT
            int     21h mov     ax,(DOS_GETVECT SHL 8) OR TIMER_INT
            int     21h                     ; save timer vector
            mov     TLoffset,bx
            mov     TLsegment,es
            mov     dx,OFFSET TimerIsr      ; install our timer service
            mov     ah,DOS_SETVECT
            int     21h ; call synth-init and enable otto ints
            mov     ax,0dee1h
            mov     bh,01h
            int     67h
            mov     dx,BasePort
            add     dl,CONTROL_OFF
            mov     al,08h
            out     dx,al ; wait, then un-mute the synth
            mov     dx,BasePort
            add     dl,ODADDR_OFF
            mov     cx,000fh
umwtlpo:
            push    cx
            mov     cx,0ffffh
umwtlpi:
            in      al,dx
            loop    umwtlpi
            pop     cx
            loop    umwtlpo
            ;
            cmp     BoardType,00h
            jne     unmvcr mov     dx,cs:WavePort
```

```
                mov     al,CD_PINCTL
                out     dx,al
                inc     dx
                in      al,dx
                or      al,40h
                out     dx,al
                jmp     unmdone
unmvcr:
                mov     dx,cs:wavePort
                mov     ah,SynthVol
                xor     ah,7fh
                shr     ah,2
                mov     al,CD_LINELVOL
                out     dx,al
                inc     dx
                mov     al,ah
                out     dx,al
                dec     dx
                mov     al,CD_LINERVOL
                out     dx,al
                inc     dx
                mov     al,ah
                out     dx,al
unmdone:
                ; enable system NMI, then VIVO NMI
                in      al,61h
                and     al,03h
                or      al,04h
                out     61h,al
                xor     al,al
                out     70h,al
                mov     dx,BasePort
                add     dl,NMICTL_OFF
                mov     al,0a0h
                cmp     SbEnable,0
                je      sbldon
                or      al,40h
sbldon:
                out     dx,al
TandSR:
                call    PrintMsg
                DB 0dh,0ah,' Initialization Complete.',0dh,0ah,0dh,0ah,0 mov es,cs:[002ch]               ; free our local environment seg
                mov ah,DOS_FREE
                int 21h mov dx,(OFFSET TsrEnd + 000fh)  ; terminate / stay resident
                shr dx,4
                mov ax,(DOS_TSR SHL 8)
                int 21h xuexit:         ; unlock XMS memory block
                mov     dx,XmsHandle
                mov     ah,0dh
                call    XmsEntry
xfexit:         ; free XMS memory block
                mov     dx,XmsHandle
                mov     ah,0ah
                call    XmsEntry
exit:           ; get outta here
                ret

_TEXT           ENDS

END Start
```

APPENDIX C   © 1996 ENSONIQ

```c
#include <stdio.h>
#include <stdlib.h>
include <i86.h> define NUM_CODEPAGES   25      /* number of 4k pages occupied by v32 code */
//#define DEBUG /* Some standard typedefs ... */
typedef unsigned char   BYTE;
typedef unsigned short  WORD;
typedef unsigned long   DWORD;

/* The following structure is the data passed in from SSINIT */
typedef struct {
    DWORD   CR3;            /* EMM's CR3 */
    WORD    GdtLimit;       /* EMM's GDT limit, linear address */
    DWORD   GdtLaddr;
    WORD    IdtLimit;       /* EMM's IDT limit, linear address */
    DWORD   IdtLaddr;
    WORD    DoOffset;       /* output data offset */
    WORD    HwOffset;       /* HW config data offset */
    WORD    GetPmiOff;      /* offset of v86 get PMI return handler */
    WORD    FixupOff;       /* offset of v86 switch return handler */
    WORD    SharedOff;      /* offset to v86/V32 shared data area */
} DATA_IN;

/* The following structure points to SSINIT's resident data area */
typedef struct {
    DWORD   VivoGentries[6];    /* VIVO GDT entries for VCPI get PMI */
    DWORD   XmsPaddr;           /* phys addr of Extended Mem */
    WORD    NumCodePages;       /* number of 4k V32 code pages */
} DATA_RES;

/* The following structure is SSINIT's HW config data */
typedef struct {
    WORD    BasePort;       /* Gate Array base port */
    WORD    WavePort;       /* CoDec base port */
    WORD    SynthPort;      /* Otto base port */
    BYTE    WaveIrq;        /* CoDec/SB IRQ */
    BYTE    MidiIrq;        /* Synth IRQ */
    BYTE    DmaChan;        /* CoDec/SB DMA channel */
    BYTE    ExtMidi;        /* External MIDI enable */
    BYTE    SbEnable;       /* SB emulation enable */
    BYTE    SynthVol;       /* Synth volume */
    BYTE    WaveVol;        /* Wave volume */
    BYTE    CdAuxVol;       /* CD/Aux volume */
    BYTE    BoardType;      /* Vivo rev number */
} HW_CONFIG;

/* The following structure is the config data at the top of the V32 code */
typedef struct {
    BYTE    JumpTable[0x1c];    /* jump instr's for multiple entry pts */
    DWORD   VivoGentries[6];    /* the VIVO VCPI Get PMI GDT entries */
    DWORD   VcpiGentries[6];    /* the real VCPI Get PMI GDT entries */
    DWORD   SharedDataP;        /* linear addr of v86/V32 shared data */
    DWORD   MidiVectOff;        /* IDT MIDI vect offset from NMI */
    DWORD   GetPmiOff;          /* QWORD far ptr to v86 Get PMI handler */
    DWORD   GetPmiSeg;
    DWORD   FixupOff;           /* QWORD far ptr to v86 switch fixup handler */
    DWORD   FixupSeg;
    DWORD   I67LinkOff;         /* PM link to the real Int 67 handler */
    WORD    I67LinkSel;
    DWORD   VcpiEntryOff;       /* PM entry point to the real VCPI handler */
    WORD    VcpiEntrySel;
    WORD    HardwareOptions;    /* bit field for board type */
    WORD    BasePort;           /* duplication of hardware config for V32 */
    WORD    WavePort;
    WORD    SynthPort;
    BYTE    WaveIrq;
    BYTE    MidiIrq;
    BYTE    DmaChan;
    BYTE    ExtMidi;
```

-68-

```
    BYTE    SynthVolL;
    BYTE    SynthVolR;
} V32_CONFIG;

/* The following structure is the DOS mem used in the VCPI Get PMI call */
typedef struct {
    DWORD   PageTable[0x0400];
    DWORD   VcpiGentries[6];
    BYTE    DosStack[0x0400 - 4*6];
} DOS_MEM;

DWORD   DosMalloc(DWORD size);
void    DosFree(WORD selector);
DWORD   GetGDT();
DWORD   GetVcpi(WORD dmseg);

DWORD       GetCR3();           /* This function returns the 386 CR3 value */
#pragma aux GetCR3 = \
    "mov    eax,cr3" \
    value   [eax];

void        FlushTLB(void);     /* This function flushes the page table TLB */
#pragma aux FlushTLB = \
    "mov    eax,cr3"    \
    "mov    cr3,eax"    \
    modify  [eax];

void        SetI(void);         /* This function disables interrupts */
#pragma aux SetI = \
    "sti";

void        ClrI(void);         /* This function enables interrupts */
#pragma aux ClrI = \
    "cli";

void main(int argc, char *argv[]) { ifdef DEBUG
    FILE            *fd;
#endif
    FILE            *fp = 0;
    DATA_IN         *pdi;
    DATA_RES        *pdr;
    HW_CONFIG       *phw;
    V32_CONFIG      *pv32;
    DOS_MEM far     *pdm;
    DWORD           *pd4g0, *pxms, *pgdt, *pidt, *ppdir;
    DWORD  volatile *pptab;
    DWORD           tmp;
    WORD            dioffset, dooffset, dsegment;
    WORD            i, j, dmseg, dmsel = 0;
    BYTE            midivect;
    char            *pc;
    static char     fname[128];
    static DWORD    TmpBuff[1024];

#ifdef DEBUG
    fd = fopen("SCOPE.DBG", "w");
#endif

/* make sure we got the right arg count, make pointers and midivect */
    if( argc < 3 )
        return;
    dioffset = (WORD) strtoul(argv[1], NULL, 16);
    dsegment = (WORD) strtoul(argv[2], NULL, 16);
    pdi = (DATA_IN *) (((DWORD) dsegment << 4) + dioffset);
    pdr = (DATA_RES *) (((DWORD) dsegment << 4) + pdi->DoOffset);
    phw = (HW_CONFIG *) (((DWORD) dsegment << 4) + pdi->HwOffset);

midivect = (phw->MidiIrq < 8 ? 0x08 : 0x68) + phw->MidiIrq;
#ifdef DEBUG
```

```
        fprintf(fd, "\npointers ...\n");
        fprintf(fd, "P v86 non-res %08lx\n", pdi);
        fprintf(fd, "P v86 res %08lx\n", pdr);
        fprintf(fd, "P v86 HW %08lx\n", phw);
        fprintf(fd, "\nEMM context ...\n");
        fprintf(fd, "CR3 %08lx\n", pdi->CR3);
        fprintf(fd, "GDT %08lx %04x\n", pdi->GdtLaddr, pdi->GdtLimit);
        fprintf(fd, "IDT %08lx %04x\n", pdi->IdtLaddr, pdi->IdtLimit);
#endif
    /* setup the DOS4GW page table-zero-pointer */
    pd4g0 = (DWORD *) (GetCR3() & 0xfffff000UL);
    pd4g0 = (DWORD *) (*pd4g0 & 0xfffff000UL);

/* setup laddr 0x180000 for EMM page dir, 0x181000 for var page tab ptr */
    *(pd4g0 + 0x0180) = (pdi->CR3 & 0xfffff000UL) | 0x67U;
    ppdir = (DWORD *) 0x180000UL;
    pptab = (DWORD volatile *) 0x181000UL;

/* point pptab at EMM's page table for the GDT, create a ptr */
    *(pd4g0 + 0x0181) = *(ppdir + (pdi->GdtLaddr >> 22));
    FlushTLB();
    /* setup page table and pointer for EMM's GDT */
    *(pd4g0 + 0x0182) = *(pptab + ((pdi->GdtLaddr >> 12) & 0x000003ffUL)) | 0x67U;
    *(pd4g0 + 0x0183) = *(pd4g0 + 0x0182) + 0x1000U;
    pgdt = (DWORD *) (0x182000UL | (pdi->GdtLaddr & 0x00000fffUL));

/* point pptab at EMM's page table for the IDT, create a ptr */
    *(pd4g0 + 0x0181) = *(ppdir + (pdi->IdtLaddr >> 22));
    FlushTLB();
    /* setup page table and pointer for EMM's IDT */
    *(pd4g0 + 0x0184) = *(pptab + ((pdi->IdtLaddr >> 12) & 0x000003ffUL)) | 0x67U;
    *(pd4g0 + 0x0185) = *(pd4g0 + 0x0184) + 0x1000U;
    pidt = (DWORD *) (0x184000UL | (pdi->IdtLaddr & 0x00000fffUL));

/* open the code file in current .exe's directory */
    strcpy(fname, argv[0]);
    pc = fname;
    while( *pc++ ) ;
    while( *--pc != '\\' ) ;
    *++pc = '\0';
    strcat(fname, "VSCAPE32.BIN");
    if( !(fp = fopen(fname, "rb")) ) {
        printf("\007 error: could not open file \"%s\".\n", fname);
        goto exit;
    }

/* get the DOS memory for the GetPMI call, setup far ptr */
    if( !(tmp = DosMalloc(5*1024UL)) ) {
        printf("\007 error: could not alocate DOS memory.\n");
        goto exit;
    }
    dmsel = (WORD) (tmp >> 16);
    dmseg = (WORD) tmp;
    * (DWORD *) &pdm = 0UL;
    * ((WORD *) &pdm + 2) = dmsel;

/* get the first chunk of our file */
    fread(TmpBuff, 1, 1024, fp);

/* setup v32 config data pointer */
    pv32 = (V32_CONFIG *) &TmpBuff;

/* make the Get PMI call, copy VCPI data into v32 config */
    pv32->VcpiEntryOff = GetVcpi(dmseg);
    for( i = 0; i < 6; ++i )
        pv32->VcpiGentries[i] = pdm->VcpiGentries[i];

/* setup the VIVO GDT entries in v32 and data-out mem */
    pv32->VivoGentries[0] = pdr->VivoGentries[0] = pv32->VivoGentries[2] =
        pdr->VivoGentries[2] = (pdr->XmsPaddr << 16) | 0xffffU;
    tmp = (pdr->XmsPaddr & 0xff000000UL) |
        ((pdr->XmsPaddr >> 16) & 0x000000ffUL) | 0x004f9300UL;
```

```c
    pv32->VivoGentries[1] = pdr->VivoGentries[1] = tmp | 0x00000800UL;
    pv32->VivoGentries[3] = pdr->VivoGentries[3] = tmp;
    pv32->VivoGentries[4] = pdr->VivoGentries[4] = 0x0000ffffUL;
    pv32->VivoGentries[5] = pdr->VivoGentries[5] = 0x00cf9300UL;

/* fill out the rest of the v32 config memory */
    pv32->SharedDataP = ((DWORD) dsegment << 4) + pdi->SharedOff;
    pv32->MidivectOff = (DWORD) (midivect - 2) << 3;
    pv32->GetPmiOff = (DWORD) pdi->GetPmiOff;
    pv32->FixupOff = (DWORD) pdi->FixupOff;
    pv32->GetPmiSeg = pv32->FixupSeg = (DWORD) dsegment;
    pv32->I67LinkOff = (*(pidt + (0x67U << 1) + 1) & 0xffff0000UL) |
        (*(pidt + (0x67U << 1)) & 0x0000ffffUL);
    pv32->I67LinkSel = (WORD) (*(pidt + (0x67U << 1)) >> 16);
    pv32->HardwareOptions = 1 << phw->BoardType;
    pv32->BasePort = phw->BasePort;
    pv32->WavePort = phw->WavePort;
    pv32->SynthPort = phw->SynthPort;
    pv32->WaveIrq = phw->WaveIrq;
    pv32->MidiIrq = phw->MidiIrq;
    pv32->DmaChan = phw->DmaChan;
    pv32->ExtMidi = phw->ExtMidi & 0x7f;
    if( phw->BoardType == 0x00 )
        pv32->SynthVolL = pv32->SynthVolR = phw->SynthVol & 0x7f;
    else
        pv32->SynthVolL = pv32->SynthVolR = 0x7f;
#ifdef DEBUG
    fprintf(fd, "\nv32 Data ...\n");
    fprintf(fd, "VIVO GDT 0 %08lx %08lx\n", pv32->VivoGentries[0], pv32->VivoGentries[1]);
    fprintf(fd, "VIVO GDT 1 %08lx %08lx\n", pv32->VivoGentries[2], pv32->VivoGentries[3]);
    fprintf(fd, "VIVO GDT 2 %08lx %08lx\n", pv32->VivoGentries[4], pv32->VivoGentries[5]);
    fprintf(fd, "VCPI GDT 0 %08lx %08lx\n", pv32->VcpiGentries[0], pv32->VcpiGentries[1]);
    fprintf(fd, "VCPI GDT 1 %08lx %08lx\n", pv32->VcpiGentries[2], pv32->VcpiGentries[3]);
    fprintf(fd, "VCPI GDT 2 %08lx %08lx\n", pv32->VcpiGentries[4], pv32->VcpiGentries[5]);
    fprintf(fd, "SharedDataP %08lx\n", pv32->SharedDataP);
    fprintf(fd, "MidivectOff %08lx\n", pv32->MidivectOff);
    fprintf(fd, "v86GetPMI %08lx %08lx\n", pv32->GetPmiSeg, pv32->GetPmiOff);
    fprintf(fd, "v86Fixup %08lx %08lx\n", pv32->FixupSeg, pv32->FixupOff);
    fprintf(fd, "INT67 Link %04x %08lx\n", pv32->I67LinkSel, pv32->I67LinkOff);
    fprintf(fd, "VCPI Entry %04x %08lx\n", pv32->VcpiEntrySel, pv32->VcpiEntryOff);
    fprintf(fd, "Hardware Opts %04x\n", pv32->HardwareOptions);
    fprintf(fd, "Ports %04x %04x %04x\n", pv32->BasePort, pv32->WavePort, pv32->SynthPort);
    fprintf(fd, "IRQS %02x %02x\n", pv32->WaveIrq, pv32->MidiIrq);
    fprintf(fd, "DMA %02x\n", pv32->DmaChan);
endif /* make entries in page table at 0x200000+ for our code, make pointer */
    for( i = 0, tmp = (pdr->XmsPaddr & 0xffff0000UL) | 0x67;
        i < NUM_CODEPAGES + 1; ++i, tmp += 0x1000U )
        *(pd4g0 + 0x0200 + i) = tmp;
    pxms = (DWORD *) (0x200000UL | (pdr->XmsPaddr & 0x0000ffffUL));

/* copy first file chunk up to Extended Memory */
    for( i = 0; i < 256; ++i )
        *pxms++ = TmpBuff[i];

/* now copy the rest of the code file up */
    while( !feof(fp) ) {
        j = (fread(TmpBuff, 1, 1024, fp) + 3) >> 2;
        for( i = 0; i < j; ++i )
            *pxms++ = TmpBuff[i];
    }

/* The next section will fill-in unused entries in the DOS4GW */
    /* page table at lin-addr 0x180000+ and setup some pointers to allow */
    /* us to access the page table, GDT, and IDT of the EMM. */

/* fill in the EMM's page-table-zero with our XMS entries */
    *(pd4g0 + 0x0181) = *ppdir;
    FlushTLB();
    for( i = (WORD) (pdr->XmsPaddr >> 12), tmp = pdr->XmsPaddr | 0x67U;
        i < (WORD) (pdr->XmsPaddr >> 12) + 25; ++i, tmp += 0x1000U )
        *(pptab + i) = tmp;
```

-71-

```c
    /* find a GDT space to patch starting from top */
    for( i = ((pdi->GdtLimit + 1) >> 2) - 2; i >= 2; i -= 2 )
        if( !(*(pgdt + i + 1)) )
            break;
    if( i < 2 ) {
        printf("\007 error: could not install service vectors.\n");
        return;
    }
    i -= 4;
#ifdef DEBUG
    fprintf(fd, "\nBase Selector %04x\n", i << 2);
#endif
    /* patch the GDT with our three service entries */
    *(pgdt + i) = *(pgdt + i + 2) = pdr->VivoGentries[0];
    *(pgdt + i + 1) = pdr->VivoGentries[1];
    *(pgdt + i + 3) = pdr->VivoGentries[3];
    *(pgdt + i + 4) = pdr->VivoGentries[4];
    *(pgdt + i + 5) = pdr->VivoGentries[5];

/* initialize some hardware ... */
    inp(phw->BasePort + 0x08);              // NMI clr
    outp(phw->BasePort + 0x02, 0x03);       // UART reset
    outp(phw->BasePort + 0x02, 0x00);
    outp(phw->BasePort + 0x06, 0x00);       // no Otto ints yet
    outp(phw->BasePort + 0x08, 0xfe);
    outp(phw->BasePort + 0x09, 0xaa);
    outp(phw->BasePort + 0x0a, 0x08);
    outp(phw->BasePort + 0x04, 0x03);
    outp(phw->BasePort + 0x05, 0x80 | (phw->DmaChan << 4));
    outp(phw->BasePort + 0x04, 0x04);
    outp(phw->BasePort + 0x05,
        (phw->WaveIrq == 9 ? 0x00 : phw->WaveIrq == 5 ? 0x04 : 0x08) |
        (phw->MidiIrq == 9 ? 0x00 : phw->MidiIrq == 7 ? 0x02 : 0x03));
    outp(phw->BasePort + 0x04, 0x06);
    outp(phw->BasePort + 0x05, 0x00);

outp(phw->WavePort, 0x0c);
    outp(phw->WavePort + 1, 0x50);
    outp(phw->WavePort, 0x49);
    outp(phw->WavePort + 1, 0x04);
    outp(phw->WavePort, 0x48);
    outp(phw->WavePort + 1, 0x00);
    outp(phw->WavePort, 0x0a);
    outp(phw->WavePort + 1, 0x80);
    outp(phw->WavePort, 0x1b);
    outp(phw->WavePort + 1, 0x08);
    outp(phw->WavePort, 0x10);
    outp(phw->WavePort + 1, 0x80);
    outp(phw->WavePort, 0x11);
    outp(phw->WavePort + 1, 0xc0);
    outp(phw->WavePort, 0x00);
    outp(phw->WavePort + 1, 0x8c);
    outp(phw->WavePort, 0x01);
    outp(phw->WavePort + 1, 0x8c);
    outp(phw->WavePort, 0x06);
    outp(phw->WavePort + 1, (phw->WaveVol ^ 0x7f) >> 1);
    outp(phw->WavePort, 0x07);
    outp(phw->WavePort + 1, (phw->WaveVol ^ 0x7f) >> 1);
    outp(phw->WavePort, 0x02);
    outp(phw->WavePort + 1, (phw->CdAuxVol ^ 0x7f) >> 2);
    outp(phw->WavePort, 0x03);
    outp(phw->WavePort + 1, (phw->CdAuxVol ^ 0x7f) >> 2);

/* now create the IDT entries for our NMI, MIDI, DOS and Int67 services */
    clrI();
    tmp = (DWORD) i << 18;
    *(pidt + (0x02U << 1)) = tmp;
    *(pidt + (0x02U << 1) + 1) = 0x00008e00UL;
    *(pidt + ((WORD) midivect << 1)) = tmp | 0x0004U;
    *(pidt + ((WORD) midivect << 1) + 1) = 0x00008e00UL;
    *(pidt + (0x67U << 1)) = tmp | 0x000cU;
```

```
        *(pidt + (0x67U << 1) + 1) = 0x0000ee00UL;
        setI();
#ifdef DEBUG
        fprintf(fd, "\nv86 Resident Data ...\n");
        fprintf(fd, "VIVO GDT 0 %08lx %08lx\n", pdr->VivoGentries[0], pdr->VivoGentries[1]);
        fprintf(fd, "VIVO GDT 1 %08lx %08lx\n", pdr->VivoGentries[2], pdr->VivoGentries[3]);
        fprintf(fd, "VIVO GDT 2 %08lx %08lx\n", pdr->VivoGentries[4], pdr->VivoGentries[5]);
        fprintf(fd, "XMS Paddr %08lx\n", pdr->XmsPaddr);
        fprintf(fd, "Num Code Pages %04x\n", pdr->NumCodePages);
#endif
        /* fill-out the rest of the resident data struct */
        pdr->NumCodePages = NUM_CODEPAGES;
exit:
        if( dmsel )
            DosFree(dmsel);
        if( fp )
            fclose(fp);
#ifdef DEBUG
        fclose(fd);
#endif
        return;
}

/* This function invokes the DPMI INT-31h call for allocating DOS memory. */

DWORD DosMalloc(DWORD size) { union REGS   r;

r.w.bx = (WORD) ((size + 15) >> 4);
        r.w.ax = 0x0100;
        int386(0x31, &r, &r);

if( r.w.cflag )
                return 0UL;

return (r.x.edx << 16) | r.w.ax;
}

/* This function invokes the DPMI INT-31h call for freeing DOS memory. */ void DosFree(WORD selector) { union REGS   r;

r.w.dx = selector;
        r.w.ax = 0x0101;
        int386(0x31, &r, &r);

return;
}

/* This function invokes the DOS-mode VCPI INT-67h call for acquiring the */
/* protected-mode interface. */

DWORD GetVcpi(WORD dmseg) { union REGS    r;
        struct SREGS  s;
        static struct {
                DWORD     edi;
                DWORD     esi;
                DWORD     ebp;
                DWORD     zero;
                DWORD     ebx;
                DWORD     edx;
                DWORD     ecx;
                DWORD     eax;
```

-73-

```
        WORD        flags;
        WORD        es;
        WORD        ds;
        WORD        fs;
        WORD        gs;
        WORD        ip;
        WORD        cs;
        WORD        sp;
        WORD        ss;
    } RmRegs = { 0UL, 0x1000UL, 0UL, 0UL, 0UL, 0UL, 0UL, 0x0000de01UL,
                 0x3000, 0U, 0U, 0U, 0U, 0U, 0U, 0x1400U, 0U};

RmRegs.ds = dmseg;
    RmRegs.es = dmseg;
    RmRegs.ss = dmseg;

segread(&s);
    r.w.ax = 0x0300;
    r.w.bx = 0x0067;
    r.w.cx = 0;
    r.x.edi = (DWORD) &RmRegs;
    s.es = s.ds;
    int386x(0x31, &r, &r, &s);

return RmRegs.ebx;
}
```

What is claimed:

1. A method of providing device virtualization to an application running under a DOS extender within a protected-mode context created for said DOS extender within a DOS-based operating system environment of a processor at run-time, said protected-mode context created for said DOS extender including an interrupt descriptor table for said DOS extender (DOS extender IDT), comprising the steps of:

storing device emulation code at a predetermined address in a memory accessible to said processor;

detecting startup of said DOS extender;

upon detection of startup of said DOS extender, patching said DOS extender IDT to include a vector to said device emulation code for a predetermined interrupt; and when said processor detects said predetermined interrupt during execution of said application, said processor referencing said vector to said device emulation code patched into said DOS extender IDT.

2. The method of claim 1, wherein said predetermined address is in extended memory addressable by said processor, and said storing step comprises the step of storing said device emulation code at said predetermined address at boot-time.

3. The method of claim 1, wherein said DOS-based operating system environment includes a virtual control program interface (VCPI) through which said DOS extender acquires said protected-mode context, said detecting step comprising the steps of:

intercepting communications between said DOS extender and said VCPI during said execution of said application; and detecting startup of said DOS extender when a communication from said DOS extender to said VCPI is a request to obtain a protected-mode interface.

4. The method of claim 3, said patching step comprising the steps of:

causing protected-mode far calls from said DOS extender to said VCPI to pass through a far call entry point of a driver, said driver executing under the protected-mode context created for said DOS extender; and said driver installing its interrupt vectors into the DOS extender IDT upon receipt of said protected-mode far calls from said DOS extender to said VCPI, said driver interrupt vectors including said vector to said device emulation code for said predetermined interrupt, thereby making said device emulation code available to said DOS extender and said application in said protected-mode context of said DOS extender.

5. The method of claim 4, including the additional steps of:

at boot time, invoking said request to obtain a protected-mode interface from said VCPI and said VCPI returning a plurality of selectors and a VCPI entry point offset;

copying said plurality of selectors and said VCPI entry point offset into a data space shared between said driver and a terminate-and-stay-resident (TSR) initialization program;

copying said data space into a physical address of allocated extended memory addressable by said processor;

copying protected-mode executable code of said driver, including said device emulation code and code for processing said request to obtain a protected-mode interface, into said allocated extended memory;

saving a linear address of a protected-mode interrupt descriptor table for said DOS-based operating system environment (system IDT);

passing said physical address of said allocated extended memory and said linear address of said system IDT to said TSR initialization program; and said TSR initialization program making an entry into said system IDT for said request to obtain said protected-mode interface, said entry including a vector to said code for processing said request to obtain a protected-mode interface stored in said allocated extended memory.

6. The method of claim 5, said detecting step comprising the steps of:

triggering said TSR initialization program when, at run time, said DOS extender calls said VCPI to request a protected-mode interface; and said TSR initialization program giving said DOS extender an entry point to said driver rather than an entry point to said VCPI.

7. The method of claim 6, said step of giving said DOS extender an entry point to said driver comprising the steps of:

said driver saving a real-mode return address for said DOS extender into said shared data space;

said driver changing the real-mode return address to a new return address;

said driver passing control to said VCPI for default handling upon receipt, at run time, of said request from said DOS extender to obtain said protected-mode interface;

upon completion of said default handling of said request to obtain said protected-mode interface by said VCPI, control passing to said TSR initialization program, via said new return address, to give said DOS extender said entry point to said driver; and said TSR initialization program making page table entries in a page table of said DOS extender so that said driver is valid within the protected mode context of said DOS extender.

8. The method of claim 7, said step of giving said DOS extender an entry point to said driver comprising the steps of:

said TSR initialization program updating said plurality of selectors and said VCPI entry point offset with values passed back from said VCPI to said DOS extender into said shared data space upon default processing of said request for said protected-mode interface;

altering said VCPI entry point offset to an offset for said driver for a VCPI far call communications intercept; and returning control to the real mode return address saved in said shared data space.

9. The method of claim 1, wherein said predetermined interrupt is a non-maskable interrupt which is generated when said application attempts to address a predetermined address related to the device to be emulated.

10. A system which provides device virtualization to an application running under a DOS extender in a DOS-based operating system environment of a processor, said DOS extender executing within a protected-mode context created for said DOS extender within said DOS-based operating system environment of said processor at run-time, said protected-mode context created for said DOS extender including an interrupt descriptor table for said DOS extender (DOS extender IDT), said system comprising:

device emulation code stored at a predetermined address in a memory accessible to said processor;

a detection program which detects startup of said DOS extender; and a driver which operates in said protected-mode context of said DOS extender and which, upon detection of startup of said DOS extender by said detection program, patches said DOS extender IDT to include a vector to said device emulation code for a predetermined interrupt, whereby, when said processor detects said predetermined interrupt during execution of said application, said processor references said vector to said device emulation code patched into said DOS extender IDT by said driver.

11. The system of claim 10, wherein said predetermined address is in extended memory addressable by said processor, and said device emulation code is stored at said predetermined address at boot-time.

12. The system of claim 10, wherein said DOS-based operating system environment includes a virtual control program interface (VCPI) through which said DOS extender acquires said protected-mode context, and said detection program is a terminate-and-stay-resident (TSR) program which intercepts communications between said DOS extender and said VCPI during said execution of said application, said detection program detecting startup of said DOS extender when a communication from said DOS extender to said VCPI is a request to obtain a protected-mode interface.

13. The system of claim 12, wherein said driver includes code which (1) receives, at run-time, protected-mode far calls redirected by said TSR program from the DOS extender, (2) enters at least said vector into said DOS extender IDT, and (3) passes control to said VCPI.

14. The system of claim 13, wherein said driver further includes an interrupt handler which reflects said request for a protected-mode interface to said TSR program.

15. The system of claim 13, wherein said driver installs its interrupt vectors into the DOS extender IDT upon receipt of said protected-mode far calls redirected by said TSR program from said DOS extender to said VCPI, said interrupt vectors including said vector to said device emulation code for said predetermined interrupt, thereby making said device emulation code available to said DOS extender and said application in said protected-mode context of said DOS extender.

16. The system of claim 12, said TSR program is triggered when, at run time, said DOS extender calls said VCPI to request a protected-mode interface, and said TSR program gives said DOS extender an entry point to said driver rather than an entry point to said VCPI.

17. The system of claim 10, wherein said predetermined interrupt is a non-maskable interrupt which is generated when said application attempts to address a predetermined address related to the device to be emulated.

* * * * *